United States Patent
Loibl et al.

(10) Patent No.: US 8,783,058 B2
(45) Date of Patent: Jul. 22, 2014

(54) COMPACT RAPID CHILLING DEVICE AND COMPACT METHOD OF RAPIDLY CHILLING CONTAINED LIQUIDS

(75) Inventors: Gregory H. Loibl, Hyde Park, NY (US); George Sidebotham, Babylon, NY (US); Michael B. Gutierrez, Roselle, NJ (US)

(73) Assignee: The Cooper Union for the Advancement of Science and Art, New York, NY (US)

( * ) Notice: Subject to any disclaimer, the term of this patent is extended or adjusted under 35 U.S.C. 154(b) by 1043 days.

(21) Appl. No.: 12/780,562

(22) Filed: May 14, 2010

(65) Prior Publication Data
US 2010/0293971 A1 Nov. 25, 2010

Related U.S. Application Data

(63) Continuation-in-part of application No. 12/044,260, filed on Mar. 7, 2008.

(60) Provisional application No. 61/178,390, filed on May 14, 2009, provisional application No. 60/905,552, filed on Mar. 7, 2007.

(51) Int. Cl.
*F25D 3/08* (2006.01)
*F25D 31/00* (2006.01)

(52) U.S. Cl.
CPC .................................. *F25D 31/007* (2013.01)
USPC ....................................................... 62/457.4

(58) Field of Classification Search
CPC ... F25D 31/007; F25D 31/006; F25D 31/002; F25D 3/02
USPC ................ 62/62, 371, 373, 312, 457.1–457.9
See application file for complete search history.

(56) References Cited

U.S. PATENT DOCUMENTS 2,655,007 A  10/1953  Lazar
2,794,326 A  6/1957  Mencacci
(Continued)

FOREIGN PATENT DOCUMENTS

DE  19910181  9/2000
EP  278884  8/1988
(Continued)

OTHER PUBLICATIONS

International Search Report and Written Opinion for PCT/US2010/034994, Jul. 30, 2010.
(Continued)

*Primary Examiner* — Cassey D Bauer
*Assistant Examiner* — Emmanuel Duke
(74) *Attorney, Agent, or Firm* — Kane Kessler, P.C.; Barry E. Negrin

(57) ABSTRACT

A compact rapid liquid chilling apparatus and method are provided. A liquid is placed in a container having an inherent void volume. The housing includes a container-securing space dimensioned to receive ice and maintain substantially all of the ice atop the container placed therein and in thermal communication with the container without allowing substantially any of the ice to fall below the container. A rotating mechanism disposed in the housing rotates the container placed in the container-securing space. As the ice melts as it chills the rotating container, the resulting water falls freely below the container as substantially all of the unmelted ice remains above the container. A lid preferably closes around the container to form a portion of the container-securing space when closed. The lid preferably includes an ice supply window, and an ice measuring bin preferably is attachable to the window.

12 Claims, 27 Drawing Sheets

(56) References Cited

U.S. PATENT DOCUMENTS

| | | |
|---|---|---|
| 3,083,547 A | 4/1963 | Stevens et al. |
| 3,283,523 A | 11/1966 | Long |
| 3,316,734 A | 5/1967 | Crane, Jr. |
| 4,139,992 A | 2/1979 | Fraser |
| 4,164,851 A * | 8/1979 | Bryant .......................... 62/381 |
| 4,304,105 A | 12/1981 | West |
| 4,531,382 A | 7/1985 | Butler et al. |
| 4,549,409 A | 10/1985 | Smith |
| 4,580,405 A | 4/1986 | Cretzmeyer, III |
| 4,628,703 A | 12/1986 | Kim |
| 4,711,099 A | 12/1987 | Polan et al. |
| 4,722,198 A | 2/1988 | Huang |
| 4,736,593 A | 4/1988 | Williams |
| 4,803,850 A | 2/1989 | Josten et al. |
| 4,813,243 A | 3/1989 | Woods et al. |
| 4,825,665 A | 5/1989 | Micallef |
| 5,282,368 A | 2/1994 | Ordoukhanian |
| 5,505,054 A | 4/1996 | Loibl et al. |
| 5,653,123 A | 8/1997 | Handlin |
| 6,637,233 B1 * | 10/2003 | Flum ............................... 62/371 |
| 2004/0112069 A1 * | 6/2004 | Loibl et al. ........................ 62/64 |
| 2005/0194342 A1 | 9/2005 | Nhan et al. |
| 2006/0185372 A1 | 8/2006 | Conde Hinojosa |
| 2008/0196447 A1 | 8/2008 | Hempell |

FOREIGN PATENT DOCUMENTS

| | | |
|---|---|---|
| GB | 1537821 | 1/1979 |
| JP | 2005-331159 | 12/2005 |
| WO | 97/35155 | 9/1997 |
| WO | 2006/061612 | 6/2006 |

OTHER PUBLICATIONS

International Search Report for PCT/US2008/003957.

* cited by examiner

COMPACT RAPID CHILLING DEVICE AND COMPACT METHOD OF RAPIDLY CHILLING CONTAINED LIQUIDS

RELATED APPLICATIONS

Domestic priority is claimed from U.S. Provisional Patent Application No. 61/178,390, filed May 14, 2009, entitled "Rapid Chilling Device and Method", the entirety of which is hereby incorporated by reference herein. This is also a continuation-in-part application of U.S. patent application Ser. No. 12/044,260, filed Mar. 7, 2008, entitled "Rapid Fluid Cooling System and Method for Hot Bulk Liquids and Container Therefor", the entirety of which is hereby incorporated by reference herein, and which in turn claims domestic priority from U.S. Provisional Patent Application No. 60/905,552, filed Mar. 7, 2007, entitled "Rapid Fluid Cooling Apparatus for Hot Bulk Liquids and Container Therefor", the entirety of which is hereby incorporated by reference herein.

BACKGROUND OF THE INVENTION

1. Field of the Invention

This invention relates to devices for use in the rapid cooling of fluids in various containers, and more particularly to such devices suitable for cooling hot liquids such as soups, stocks, sauces, and the like, or pre-contained beverages such as soda, beer, energy drinks, or the like.

2. Description of Related Art

In the food preparation industry, kitchens create stock to be used in gravy, soups, and other foods served along with meals. The stock is made by cooking meat, bones, fat and the like in water to a temperature of 190° Fahrenheit to both pasteurize the mixture and allow the heated water to absorb the fat. It is currently common practice to create between 1 and 100 gallons of stock and let it sit in an open pot. The pot is usually stored in either a kitchen sink or a refrigerator/freezer. Often, as the stock is cooling off, airborne contaminants may enter the stock, creating a safety and health hazard in the kitchen and ultimately to the consumer. Bacteria also grows extremely rapidly in the temperature range between 140° and 41° F., often doubling every 20 minutes in this temperature range. The stock often takes between 1 to 7 hours to chill depending on the quantity and method of chilling.

There are several conventional methods of chilling stock. A common method is simply to place the stock into a refrigerator. Given that it takes two hours to chill 12 oz. of liquid in this manner, chilling a commercial quantity of stock in this manner requires an extremely long time (several hours, depending on the quantity to be chilled) to bring the stock down to a safe temperature of 40° F., and it often puts considerable strain on the refrigerator, raises the temperature of the refrigerator, and thus threatens the safety of all the food stored therein. Refrigerators are ill-served for this practice because they are not designed to chill hot food quickly, they are simply designed to keep cold food cold. Even food that is chilled in ambient air to room temperature (~70° F.) and then placed in a refrigerator will still require a lot more chilling time to get to 40° F. The process may be accelerated by chilling the food in an ice water bath and then placing it into a refrigerator, however this will still take at least two hours and require a very large ice water bath to accommodate large quantities of food.

One conventional method that is slightly better than those mentioned above is to pour the stock/food into one gallon bags, place the bags into a cold water bath for at least an hour, and then place the bags into a refrigerator. Even so, there are drawback to this method, as it still takes too long and results in many individual units of stock/food that cannot be stored in a space-efficient manner (owing to the lack of a discrete shape to the bag). Also, the cold water bath temperature rises precipitously and the compressor is not strong enough to keep up with the rising temperature. As such, it is frequently necessary to add ice to the cold water bath. Additionally, the bags are single use and disposable. This method is thus not environmentally friendly as waste plastic is generated, nor is it economically friendly, as new bags must continually be purchased.

Another conventional way to hasten the cooling of such liquids is the use of a cold paddle or ice paddle such as that described in U.S. Pat. No. 5,058,396 to Faiola. Typically, a plastic wand or paddle having one or more projections is filled with a cooling medium such as water, cooled or frozen in a refrigerator or freezer, and inserted into and stirred within the hot stock/food to hasten the cooling of the stock/food. There are many problems with such a device. First, the paddle must be inserted and stirred manually, which requires great effort on the part of the stirrer. Also, the stirrer must be positioned substantially right over or in front of the open vat of stock, which is an excellent way of communicating bacteria from the stirrer to the food. Additionally, the paddle is made of a lightweight material such as plastic to make it easy to handle, however plastic is not an exceptionally efficient transmitter of heat (i.e., it has good insulative properties). The paddle itself may also be contaminated with bacteria or traces of other foods into which it had previously been dipped, thereby directly introducing bacteria, allergens, or other undesirable foreign agents into the food. Moreover, operators tend to forget that water expands when it freezes, and they tend to fill the paddle completely with water prior to freezing. The result is that many such ice paddles crack when the water inside freezes and expands. Cracked paddles are extremely unsanitary and rapidly break down and must be replaced.

Other conventional methods include using a device called a "blast chiller", which is essentially a very powerful refrigerator. Typical blast chillers are manufactured by the Traulsen company of Fort Worth, Tex. However, a typical blast chiller will still take 90 minutes to cool 24 gallons of food from 135° F. to 40° F. Such a device would require about 2½ hours to cool 24 gallons of food from 190° F. to 40° F. and does not really benefit the commercial kitchen that generates up to 100 gallons of food at a time. Moreover, a typical blast chiller costs between $15,000 and $70,000, making it a very expensive appliance, especially for a small commercial kitchen.

Another existing device is called a tumble chiller which resembles an extremely large washing machine. It consists of a 4-5 foot diameter rotating drum disposed within an even larger water bath, and it accepts 4-8 quart bags of food. The food bags are sloshed around in the drum until cool. Typical tumble chillers are manufactured by the Cleveland Range company of Cleveland, Ohio. There are several disadvantages to the tumble chiller. First, it occupies an enormous amount of space. Second, it requires a large number of very small bags of material to be cooled. Third, because the bags flop around within the rotating drum, there is a significant chance of breakage. Additionally, when the bags are removed, because they have no discernible shape, they are difficult to stack and store. Moreover, a typical tumble chiller costs between $50,000 and $100,000, an extremely expensive proposition.

All of the above conventional devices are poor at rapidly cooling hot bulk liquid yet are designed for use in large commercial kitchens. None are suitable for small commercial kitchens such as those of restaurants, bars, and the like.

A vastly improved stock chilling device is disclosed in co-pending U.S. patent application Ser. No. 12/044,260 to Loibl et al., filed Mar. 7, 2008, and entitled "Rapid Fluid Cooling System and Method for Hot Bulk Liquids and Container Therefor" (having substantially the same inventors as the instant inventors and which is assigned to the same instant assignee), the teachings of which are incorporated by reference herein. This device works rapidly and efficiently. However, it is rather large and designed for large commercial kitchens. Small- to medium-sized kitchens, such as in a restaurant or a bar, would have difficulty accommodating the bulk and expense of this device.

There also exist devices designed to rapidly chill beverages in containers, as described in U.S. Pat. Nos. 5,505,054 and 6,662,574 to Loibl et al. (having substantially the same inventors as the instant inventors and which are assigned to the same instant assignee), the teachings of which are incorporated by reference herein. Both patents teach devices which chiefly use ice water stored in a reservoir as a cooling medium. A pump forces the water component up to a spray jet which sprays the container as it is rotated rapidly.

Accordingly, there is a long-felt need to provide a system and device for rapidly cooling and subsequent storing of moderately large quantities of extremely hot liquids such as commercially prepared stocks, soups, sauces, gravies, and the like, that is simple and inexpensive to use and to manufacture and has a small overall footprint. There is also a long felt need to provide an inexpensive, simple to use, and simple to manufacture device to chill beverage containers rapidly, even simpler than the existing Loibl devices mentioned above.

SUMMARY OF THE INVENTION

The invention includes a method and system for rapidly cooling liquids, be they hot liquids such as stock, soup, sauces, or gravies, or beverages such as soda, juice, or beer.

In one embodiment, the invention includes a method of rapidly cooling hot bulk liquids, comprising the steps of placing a hot bulk liquid in a sealable container having an inherent void volume, preferably of at least 5%, placing the container in a substantially horizontal orientation, rotating the container substantially about its longitudinal axis, and placing ice securely atop the container while the container is rotating. The speed of rotation of the container may be varied depending on the viscosity of the hot bulk liquid to be cooled; the greater the viscosity of the hot bulk liquid to be cooled, the slower the rotation rate of the container during the rotating step. The speed of rotation may also be varied depending on user preference, e.g., to avoid degradation of the food contents of the container. The rotating step is preferably performed until the hot bulk liquid is cooled to approximately 40° F. In addition or in the alternative, the rotating step is performed until a partial vacuum is created within the container. The amount of ice to be used to chill a given container is preferably premeasured so that when the ice has completely melted, the container's contents are satisfactorily chilled.

In previous embodiments, a reservoir was provided to contain a cooling medium such as ice water. In the instant embodiment, the container is placed in a container bay having an open or openable top and walls dimensioned substantially the same as the container. Preferably, there is no more than a ⅛ inch space between the walls of the container and the walls of the container bay. Ice is placed atop the container after the container is placed inside the container bay. Because of the very narrow space between the container wall and the side walls of the container bay, the ice remains atop the container even as the container is rotated. As the ice melts, the contents of the container are chilled. Water from the melted ice drains out of the device substantially as it falls, i.e., it does not collect.

More specifically, the invention is a compact rapid liquid chilling device. A housing is provided including a container securing space adapted to secure a container of liquid to be chilled. The container securing space is dimensioned to receive a quantity of ice and maintain substantially all of the ice atop a container placed in the container securing space and at least partially in thermal communication with the container without allowing substantially any of the ice to fall below the container. A rotating mechanism is disposed in the housing in communication with the container securing space and is adapted to rotate a container placed in the container securing space. As the ice melts to form water as heat is extracted from the contents of the container, the water is allowed to fall freely below the container as substantially all of the as-yet unmelted ice remains above the container. Preferably, the water forms a thin film that is allowed to fall freely around the container while the rest of the unmelted ice remains above the container.

Preferably, the housing includes a lid closable around the container, and the lid preferably includes an interior lid space that, when the lid is closed, forms a portion of the container securing space. More preferably, a window is formed in the lid adapted to allow ice to be supplied to the container securing space.

Preferably, the housing includes a base which includes a first portion of the container securing space, and the lid includes a second portion of the container securing space when the lid is closed.

The inventive compact rapid liquid chilling device preferably includes an ice bin having side walls and an opening, the opening being adapted to fit together with the window in the lid. The ice bin is adapted to allow the user to pre-measure the quantity of ice necessary to chill the contents of the container to a desired temperature. The invention preferably includes at least one ice guard, disposed at an edge of the window and extending towards the container, adapted to substantially prevent ice from the ice bin from falling below the container.

A drain is preferably provided in the housing that allows the water that falls below the container to exit the housing.

Optionally a movable wall is provided selectively disposable within the housing and adapted to allow the user to adjust the volume of the container securing space.

In another aspect of the invention, the above-described compact rapid liquid chilling device includes a sealable container having an inherent void volume adapted to receive a liquid.

The invention also includes a method of rapidly chilling a liquid. First, a liquid at a higher-than-desired temperature is placed in a sealable container having an inherent void volume. The container is placed in a substantially horizontal orientation, and a quantity of ice is loosely and freely placed atop or otherwise in thermal communication with the container while being prevented from falling below the container. The container is rotated substantially about its longitudinal axis. The rotating step is performed until at least one of i) the liquid reaches a desired temperature or ii) all of the ice has melted. The speed of rotation may be varied according to user preference, e.g., to minimize food degradation during rotation.

The invention also includes a container for rapidly cooling hot bulk liquids by way of rotating the container about its longitudinal axis and cooling the contents of the container with ice placed securely atop the container as it is rotated. The container includes a housing that is preferably substantially cylindrical and a top sealingly attachable to the housing. The top includes an inherent void volume, preferably a void volume of at least 5% of the volume of the housing. Attachment means are provided for sealingly attaching the top to the housing; a first mating portion of the attachment means is disposed on the housing, and a second mating portion of the attachment means is disposed on the top. When the top is attached to the housing, the void volume of the top traps air inside the container even if the housing is completely filled prior to attachment of the top.

In one embodiment of the inventive container, the first mating portion includes a first set of threads disposed on the housing and the second mating portion comprises a second set of threads disposed on the top. Alternatively, the attachment means may include at least one of i) a bayonet fitting between the top and the housing; or ii) clips disposed on an exterior of the container (e.g., such as are found on a mason jar).

Regardless of how the container is sealed, the inventive container may preferably include a projection disposed on an upper surface of the top. The projection facilitates tightening of the top onto the housing. The container may, in addition or the alternative, include a recess formed on an underside of the housing. The recess is adapted to fit atop a raised portion of a container tightening station to substantially prevent the housing from moving when a user tightens the top on the housing. The container recess on the bottom of the housing is preferably substantially the inverse of the container projection on the top of the container, so that multiple containers can thus be stacked with enhanced stability. The container may also include a liner disposed within the housing.

The invention also includes a system of rapidly cooling hot bulk liquids. The inventive system includes a chilling station, which includes a container bay adapted to receive at least one container of liquid to be cooled. At least one rotator is adapted to rotate a container placed in the container bay substantially around the container's longitudinal axis. The container bay has an open or openable top and walls dimensioned substantially the same as the container. Preferably, there is no more than a ⅛ inch space between the walls of the container and the walls of the container bay. Ice is placed atop the container after the container is placed inside the container bay. Because of the very narrow space between the container wall and the walls of the container bay, the ice remains atop the container even as the container is rotated.

Generally speaking, the invention is a system for chilling hot food liquids such as stock, soups, sauces, and gravies, and/or beverages such as sodas, juices, or beers. Sealed containers of liquid are placed on the rotating mechanism inside a container bay, ice is placed securely atop the container, and the container is rotated about its longitudinal axis. The contents of the container can be cooled from a cooking temperature (e.g., ~190° F. to a cold storage or drinking temperature (e.g., ~40° F.) very rapidly. The rotation rate of the containers varies based on container diameter and the viscosity of the liquid contained.

The inventive system also includes a special container for holding quantities of stock/food to be chilled. The container includes a void volume, preferably at least 5% void volume, included in the container once the lid is attached. The container side is substantially straight (i.e., the container is substantially a regular cylinder) to allow for rotation with little interference. A handle is provided in the lid of the container for ease of carrying, ease of placement, and ease of tightening the lid. The container is stackable, and it preferably includes a protrusion on one of the top of the lid or the bottom of the base and a mating recess on the other of the top of the lid or the bottom of the base If the protrusion is provided on the lid (and the recess on the bottom of the base), the container is provided with a tool will allow for both tightening and removing the lid. The tool includes a wrench for gripping the protrusion and a fixed mounting station having a similar protrusion onto which the recess of the base of the container is placed. The handle of the container is preferably disposed within the perimeter of the protrusion on top of the lid.

DETAILED DESCRIPTION OF THE INVENTION AND DRAWINGS

Description of the invention will now be given with reference to FIGS. 1-16. It should be understood that these figures are exemplary in nature and in no way serve to limit the scope of the invention, which is defined by the claims appearing hereinbelow.

Figure 1A:
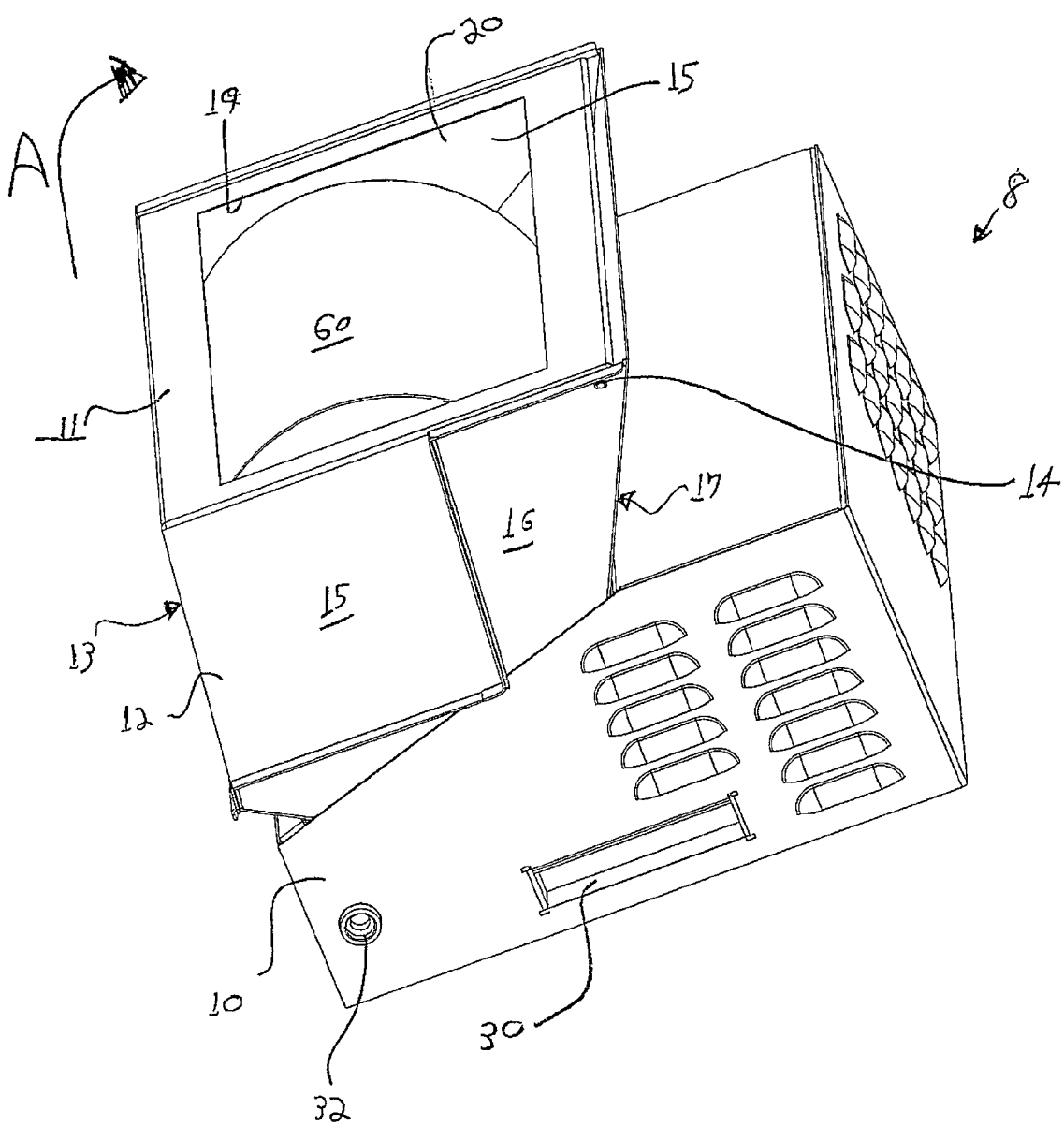
FIG. 1A is a top perspective view of a compact rapid chilling device in accordance with the invention.
Figure 1B:
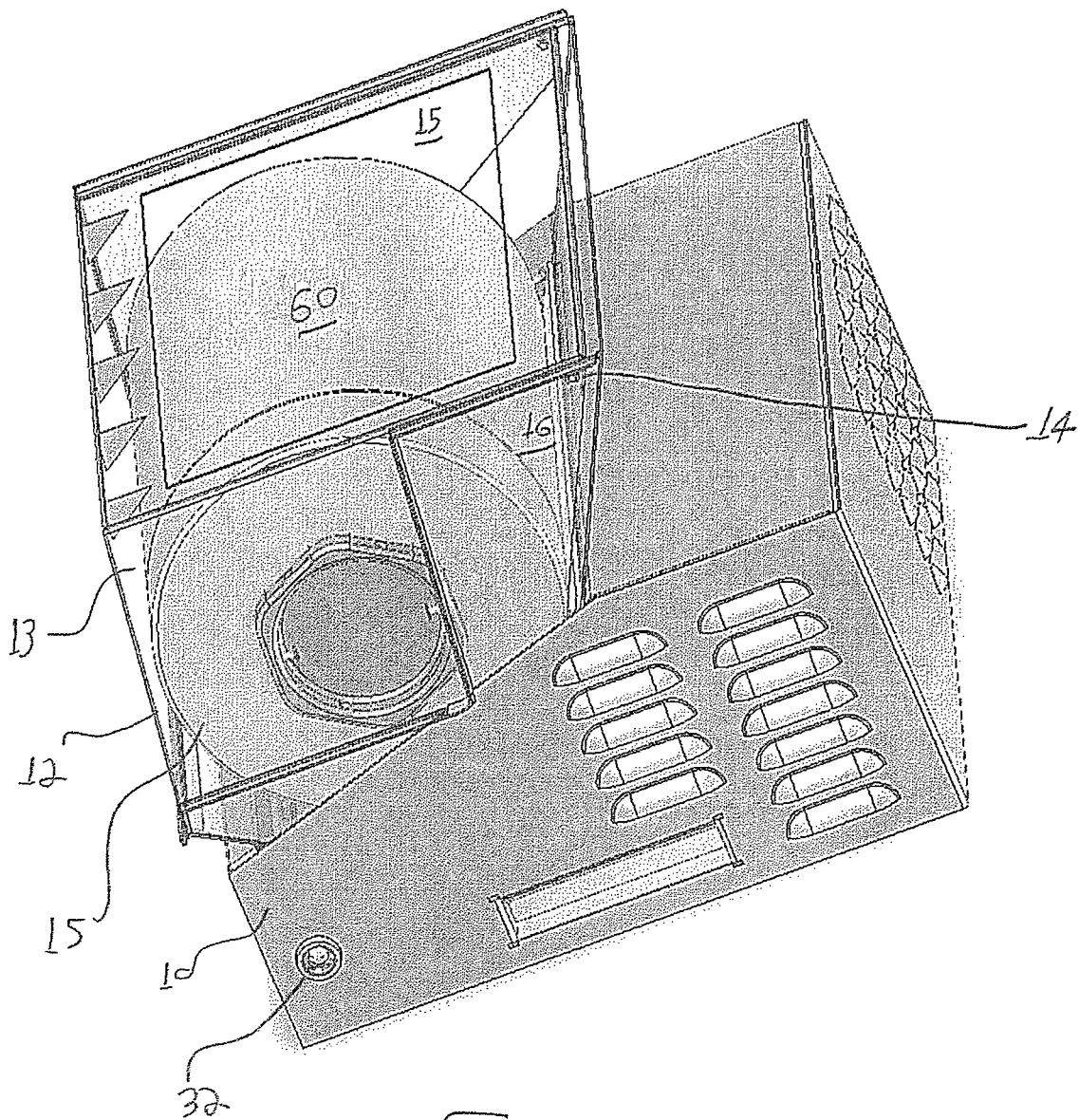
FIG. 1B is a top perspective view of the compact rapid chilling device of FIG. 1A with the lid and hull made transparent for clarity.
Figure 1C:
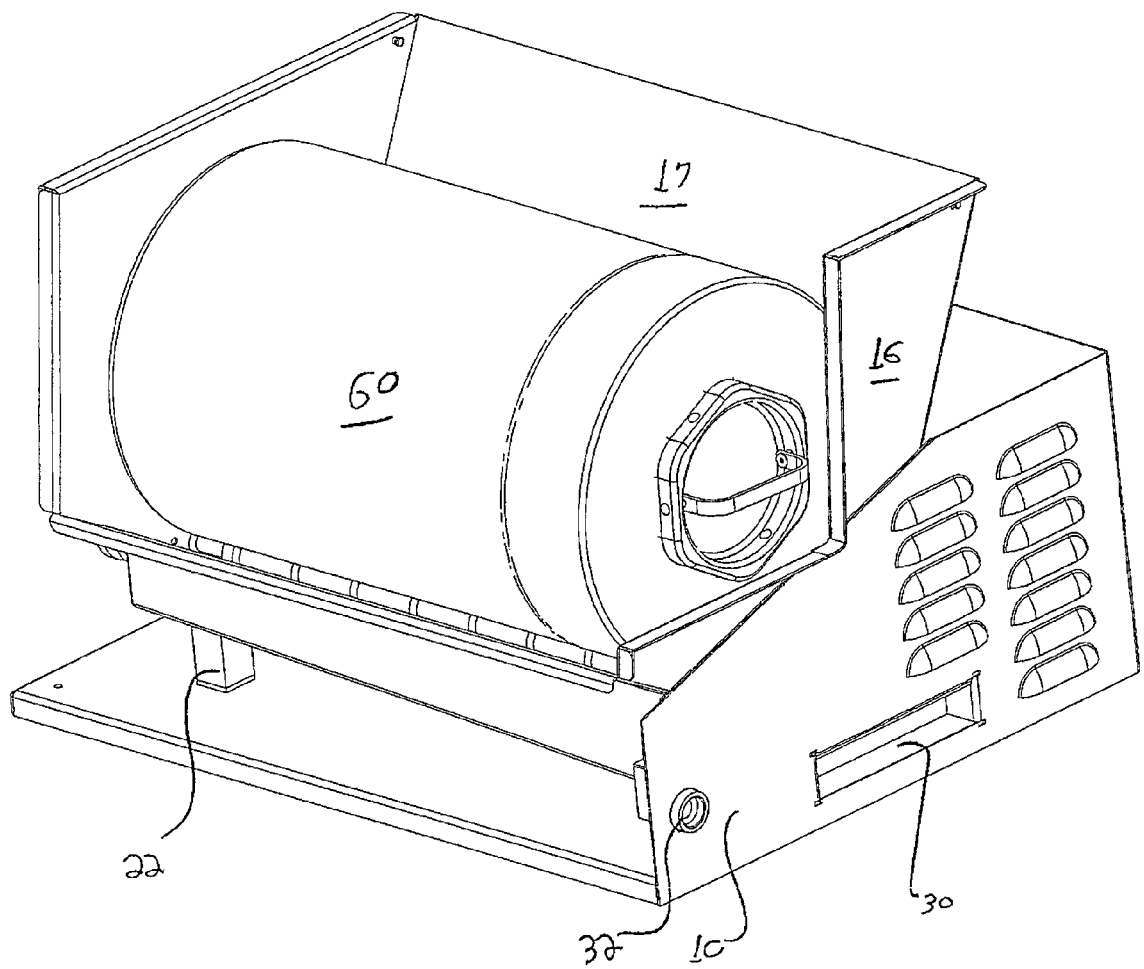
FIG. 1C is a front perspective view of the compact rapid chilling device of FIGS. 1A-B with the lid removed for clarity.
Figure 1D:
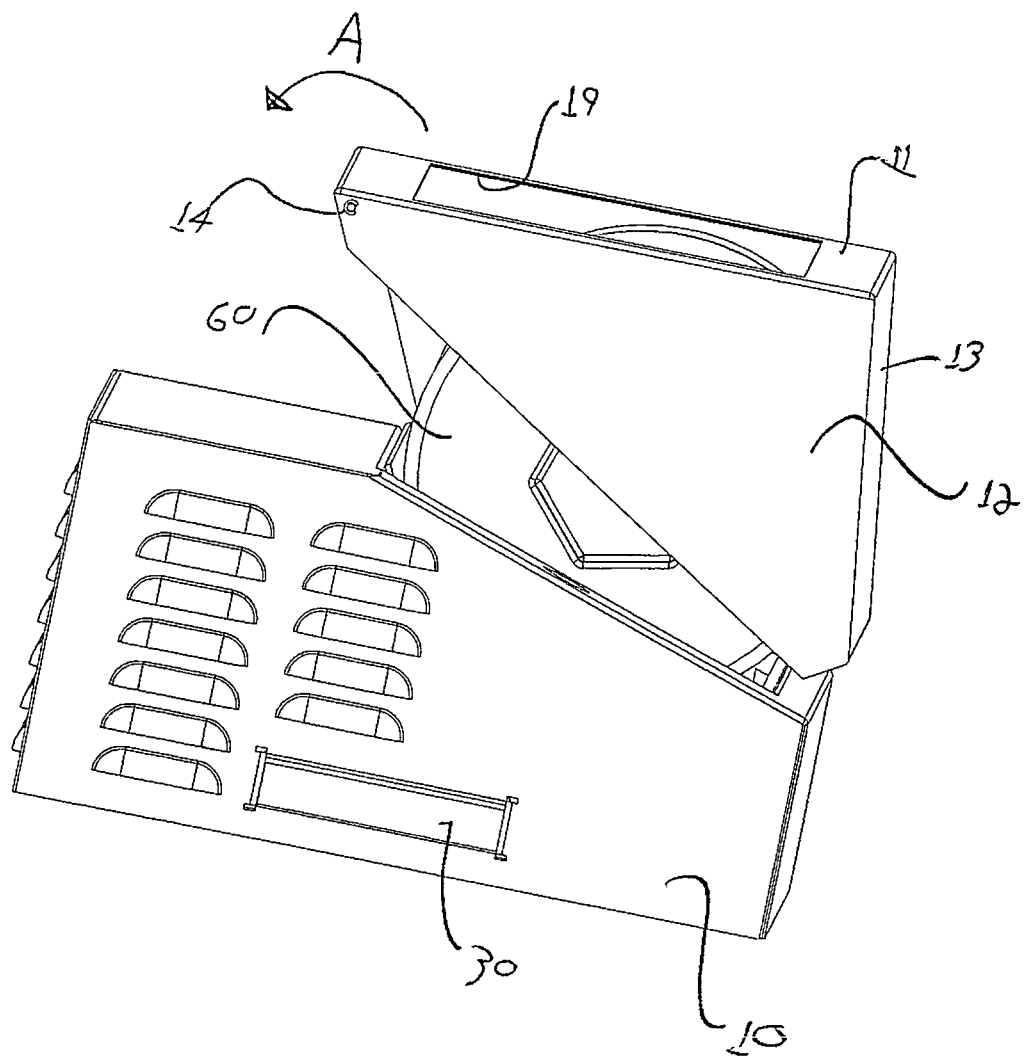
FIG. 1D is a side perspective view of the compact rapid chilling device of Figs. 1A-C with the hull removed for clarity.
Figure 2A:
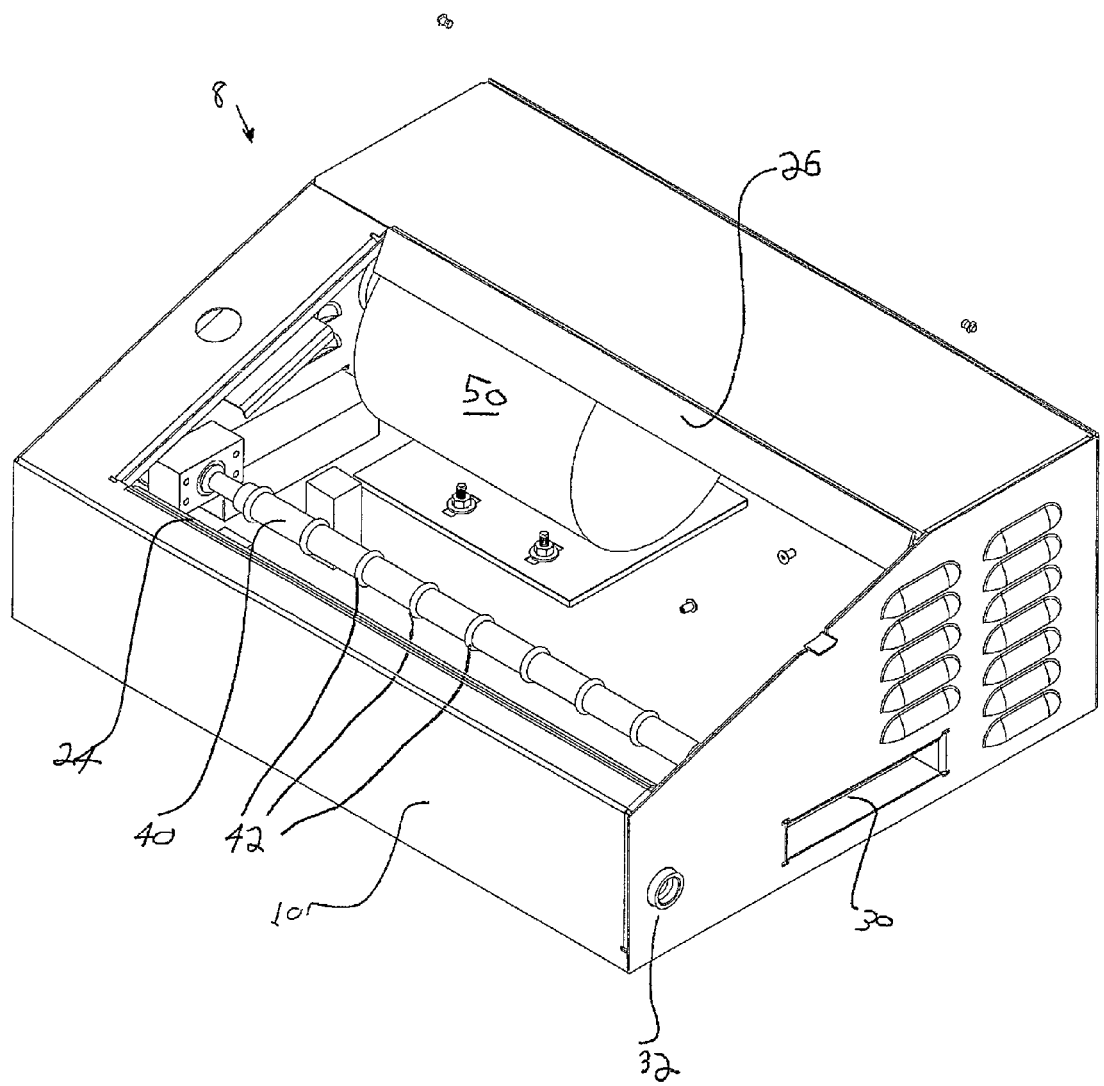
FIG. 2A is a top perspective view of the compact rapid chilling device of FIG. 1 with the lid and hull removed for clarity to expose partially the inner mechanism of the device.
Figure 2B:
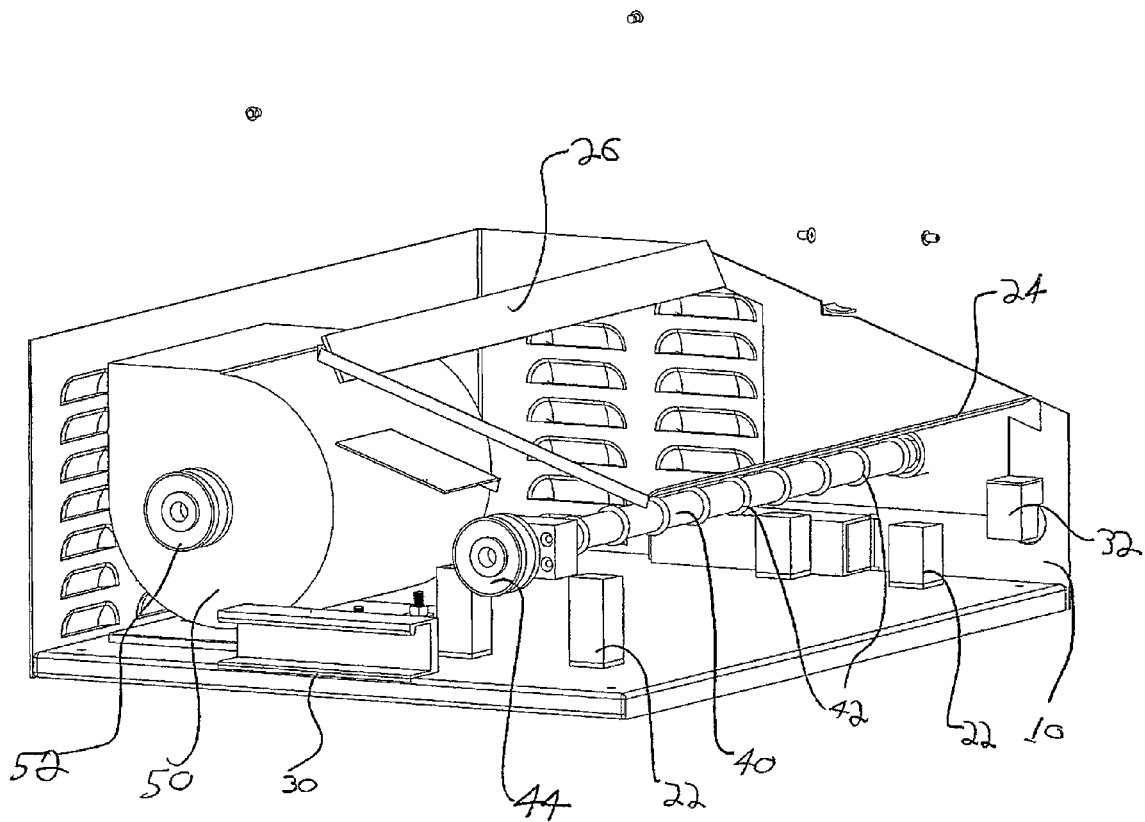
FIG. 2B is a side perspective view of the compact rapid chilling device of FIGS. 1 and 2A with the lid, hull, and housing removed for clarity to expose the inner mechanism of the device.

The invention is embodied in a first version best suited for rapidly chilling hot stock, soup, or gravy. As shown in FIGS. 1-2, device 8 includes a main housing 10 upon which lid 12 and hull 16 are disposed. Lid 12 is preferably pivotally attached to hull 16 at pivots 14 and can open in the direction of arrow A (see FIGS. 1A and D). Lid 12 includes a front wall 13, side walls 15, and a window or opening 19 formed in its upper panel 11. Alternatively, upper panel 11 may be omitted entirely to leave the entirety of lid 12 open, for reasons explained below. When lid 12 is closed atop hull 16, front wall 13, side walls 15, and hull wall 17 form a largely enclosed container bay 20 adapted to receive a container 60 (to be described below). It is intended that ice (not shown) be placed in bulk (preferably in cube or chip form) atop a container 60 inside container bay 20, either through window 19 or the open top of lid 12. As can best be seen from FIG. 1B, the tolerance between container 60 and the walls 13, 15, and 17 of container bay 20 are extremely small, on the order of 0.1 inches. Indeed, in many cases, container 60 will contract as it is chilled. A 5-gallon stainless steel container having a plastic liner can contract as much as 0.5 inches in the longitudinal direction (there is typically less contraction in the diametric direction). As such, the tolerance mentioned above is for the cold, contracted container; it is even smaller at or near zero for a hot, fully expanded container. In any event, after the ice is placed atop container 60 in container bay 20, substantially all of the ice remains atop the container, and substantially none of the ice falls below the container into the bottom of hull 16, owing to the tight tolerances between container 60 and container bay 20.

The inner workings of device 8 are depicted more clearly in FIG. 2. A front mount pad 24 provides cushioning and sealing for the lip of lid 20 when it is closed. Passenger wall 26 supports container 60 as it rotates and helps prevent ice from falling below the container. When container 60 is placed in container bay 20, it sits atop frictional contact rings 42 of roller 40. Motor 50 provides the actuation of roller 40; preferably, motor 50 includes a driver pulley 52 which communicates with roller pulley 44 via a belt (not shown). Roller pulley 44 is coaxial with roller 40, so that rotation of roller pulley 44 directly causes rotation of roller 40. Owing to the frictional contact between rings 42 and container 60, as roller 40 rotates, container 60 rotates in the opposite direction.

As container 60 is rotated, the ice thereupon melts and cools the contents of the container. Because the container is rotating, the contents are chilled much more rapidly than if the container were merely sitting in an ice bath, for reasons discussed in U.S. Pat. No. 5,505,054 mentioned above. The water from the melting ice drips down into hull 16 and exits device 8 via drain 32. Drain 32 is connectable to a hose or a spout or the like which allows the water to be conducted to a sink or a bucket. Because device 8 has no reservoir, unlike the previous Loibl stock chiller, it can be made much smaller and less expensively and can easily fit on a countertop in a small commercial kitchen such as found in a restaurant or bar.

Another way that device 8 can be made much less expensively than the previous Loibl stock chiller is by eliminating some or all of the controls concerning operation of motor 50 (and hence the rotation of roller 40). Previous embodiments have included timing mechanisms which automatically shut off the device after a predetermined interval when the contents of the container are adequately chilled. Here, no timing mechanism is needed, because the device can be operated simply for as long as there is ice in container bay 20. When the ice is melted, the container is chilled. It is preferred that device 8 be provided with one or more ice measuring bins 100 (see FIGS. 13 and 14, to be discussed below) that will premeasure the correct quantity of ice for a given container and/or a given type of liquid to be contained. Thicker sauces and soups may require more ice to chill than a thin stock, so a larger ice measuring bucket may be provided to chill sauces and soups. Additionally, the ice measuring buckets are adapted to be invertable atop window 19 and remain there full of ice, thereby extending the effective height of container bay 20 and allowing significantly more ice to be involved in the cooling process than what can fit inside container bay 20 below window 19. In any event, by providing a preset amount of ice for a preset size of container, proper chilling of the contents is assured.

Housing 10 includes handles 30 for easy transport and portability. Hull 16 includes hull support feet 22 (see FIG. 2B) for supporting the bottom of the hull, which can get quite heavy (upwards of 18 kg) once a full container 60 and ice are added to container bay 20. It is preferred that device 8 only be moved when not in use and when container bay 20 is devoid of either container 60 or ice.

FIGS. 11-16 depict an embodiment of the invention similar to that shown in FIGS. 1-2. Like elements are given like reference numerals, and description thereof will not be repeated.

Figure 12:
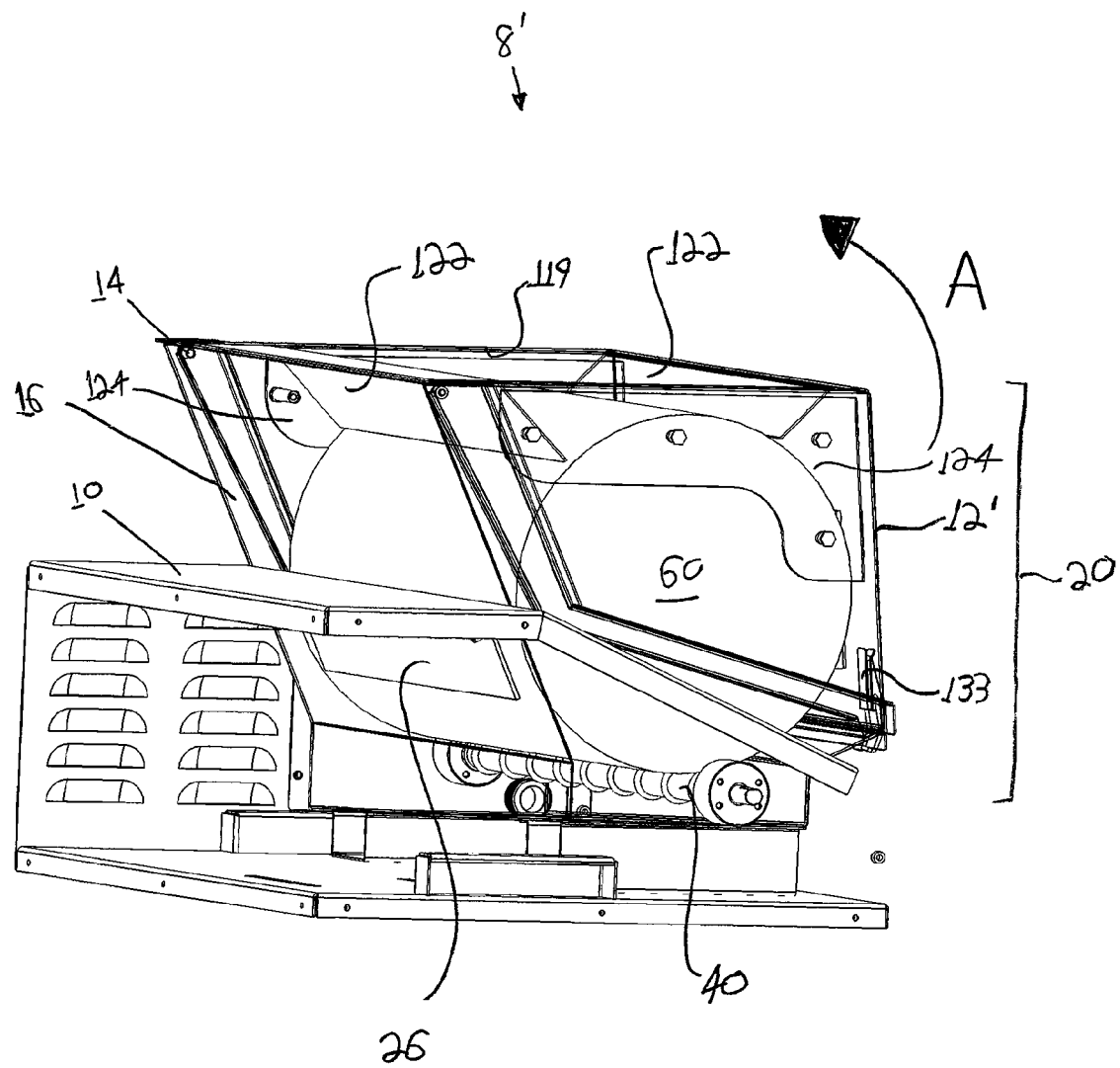
FIG. 12 is a right perspective view of the compact rapid chilling device of FIG. 11 with the lid made transparent and portions of the housing removed for clarity.
Figure 16:
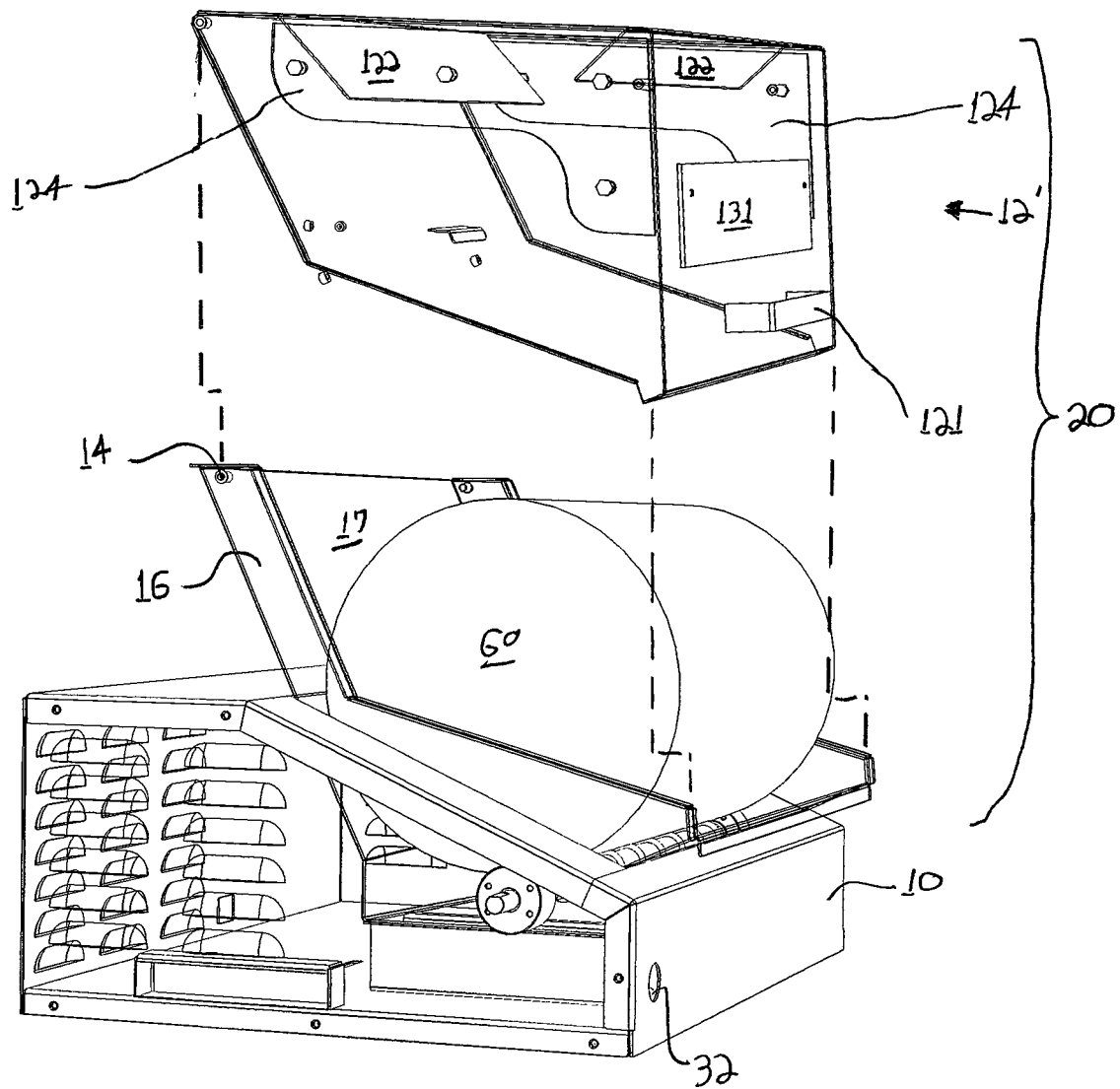
FIG. 16 is an exploded perspective view of compact rapid chilling device of FIGS. 11-13.

Device 8' includes a main housing 10 upon which lid 12' and hull 16 (see FIGS. 12, 15, and 16) are disposed. Lid 12' is preferably pivotably attached to hull 16 at pivots 14 and can open in the direction of arrow A (see FIG. 12). Lid 12' includes a front wall, side walls, and an upper window or opening 19. When lid 12' is closed atop hull 16, the front wall and side walls of the lid and hull 16 form a largely enclosed container securing space or container bay 20 adapted to receive a container 60 (see FIGS. 12 and 16). As best seen in FIGS. 12 and 16, a portion of the container securing space 20 is inside housing 10 and hull 16, and the remainder is inside the interior of lid 12'. Ice (not shown) is to be placed in bulk (preferably in cube, chip, or crushed form) atop container 60 inside container bay 20 through window 19 as described below.

Figure 11:
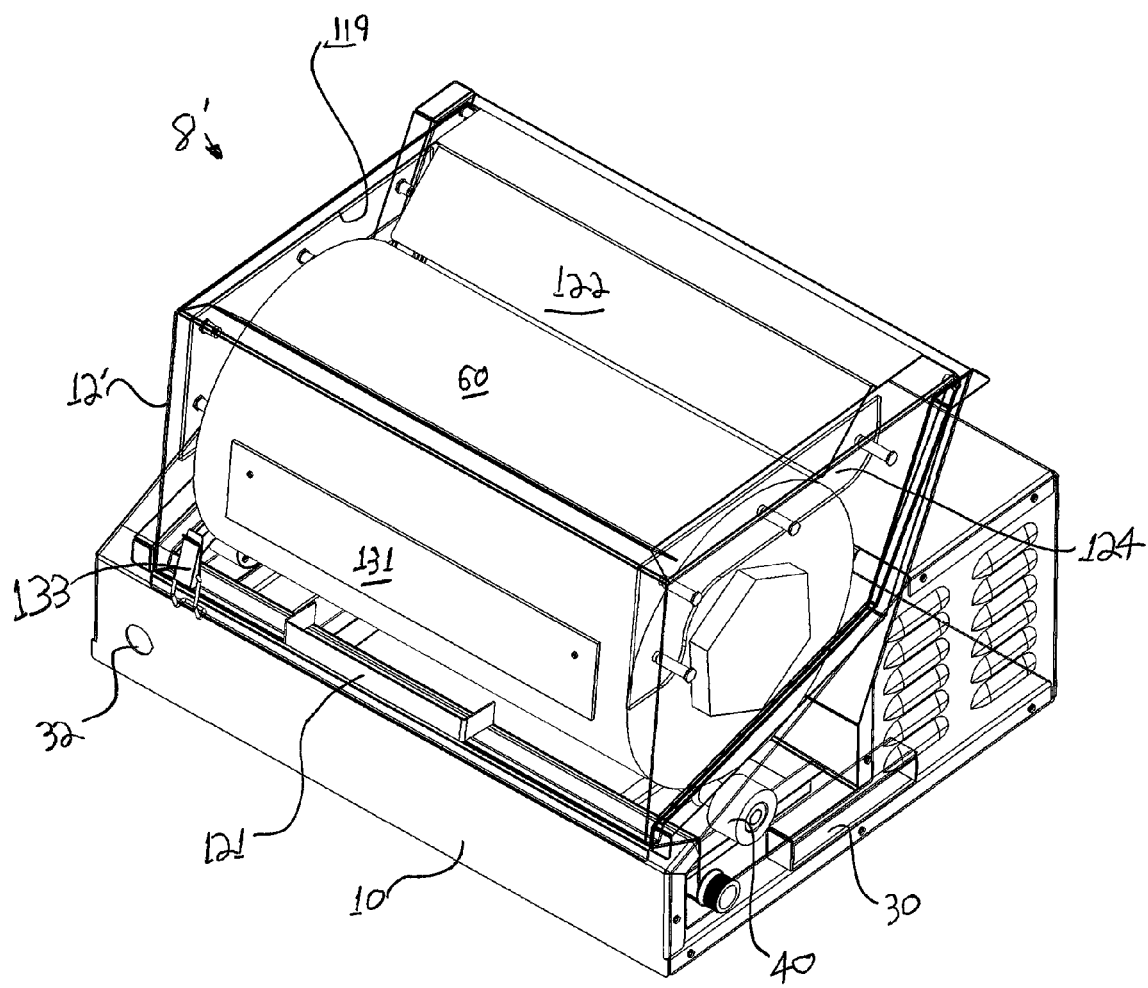
FIG. 11 is a top left perspective view of a preferred embodiment of a compact rapid chilling device in accordance with the invention with the lid and housing made transparent for clarity.

As can best be seen from FIG. 11, as above, the tolerance between container 60 and the walls of the container securing space 20 are extremely small, on the order of 0.1 inches. As such, after the ice is placed atop container 60, substantially all of the ice remains atop the container and substantially none of the ice falls below the container into the bottom of the device.

The preferred drive mechanism in this embodiment is substantially similar to that of FIGS. 1-2: motor 50 provides the actuation of roller 40; preferably, motor 50 includes a driver pulley 52 which communicates with roller pulley 44 via a belt (not shown). Roller pulley 44 is coaxial with roller 40, so that rotation of roller pulley 44 directly causes rotation of roller 40.

In both this embodiment and that of FIGS. 1-2, different speeds of rotation can be achieved by simply changing the relative sizes of driver pulley 52 and roller pulley 44. As an example, a device 8 or 8' utilizing a 3-inch driver pulley 52 and a 3-inch roller pulley 44 can produce container rotational speeds of approximately 150 rpm. However, the user may wish to have a slower speed of rotation for reasons such as preventing food degradation (e.g., some of the solid portions of the food, e.g., vegetables, may disintegrate when rotated at 150 rpm). So, as another example, a 1-inch driver pulley 52 and a 4-inch roller pulley can be used to produce container rotational speeds of approximately 40 rpm. The slower rotational speed will slightly lengthen chill times of the contents of the container, however even the longer chill time is still most satisfactory (e.g., 8 minutes rather than 6 minutes), and the user does not have to suffer food degradation or the like. Apart from such concerns, the invention adapted to chill optimally at rotational speeds of 30-250 rpm.

Other features of this embodiment are depicted in FIGS. 11 and 12. For example, as above, housing 10 includes a passenger wall 26 (see FIG. 12) that supports container 60 as it rotates, provides a low-friction interface between the container and the device, and helps prevent ice from falling below the container. Lid 12' also includes a passenger wall 131 (see FIGS. 11 and 16) that supports container 60 as it rotates and provides a low-friction interface between the container and the lid to protect the material of both the container and the lid. At least one and preferably two ice guards 122 are provided in lid 12' near window 19, which help to prevent the ice disposed atop container 60 from falling into the bottom of the unit. The tolerance between ice guards 122 and container 60 is preferably in the range of 0.16 -0.20 inches. Tight tolerance is necessary to prevent the ice from falling past the container, however too tight a tolerance between ice guards 122 and container 60 is not desirable, as it causes water to pool on top of the container in window 19 rather than form the preferred thin film around the container. Guide walls 124 help to prevent container 60 from moving back and forth, and they also help prevent the ice from falling past the container. The tolerance between guide walls 124 and the top and bottom of container 60 is preferably in the range of 0.16 -0.20 inches when the container is fully chilled and contracted; the tolerance is at or near zero when the container is in its hot, fully expanded state. Latch 133 is provided to lock down lid 12' to housing 10 in a closed position to ensure lid 12' does not open during operation of the device, and to ensure that the addition of ice atop the container does not force the lid open and allow the ice to fall below the container.

Figure 13:
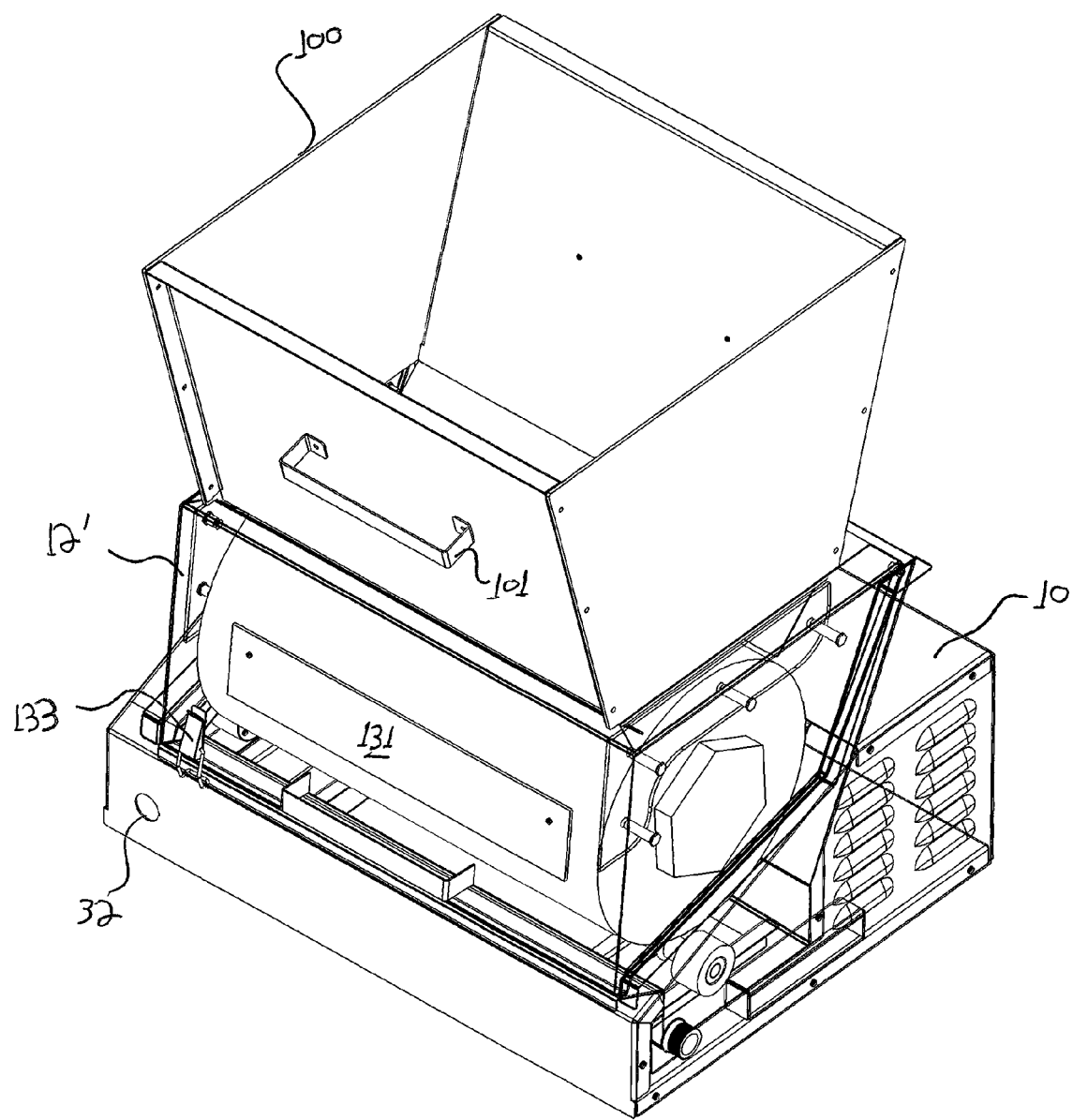
FIG. 13 is a top left perspective view of the compact rapid chilling device of FIG. 11 with an inventive ice bin attached thereto.
Figure 14A:
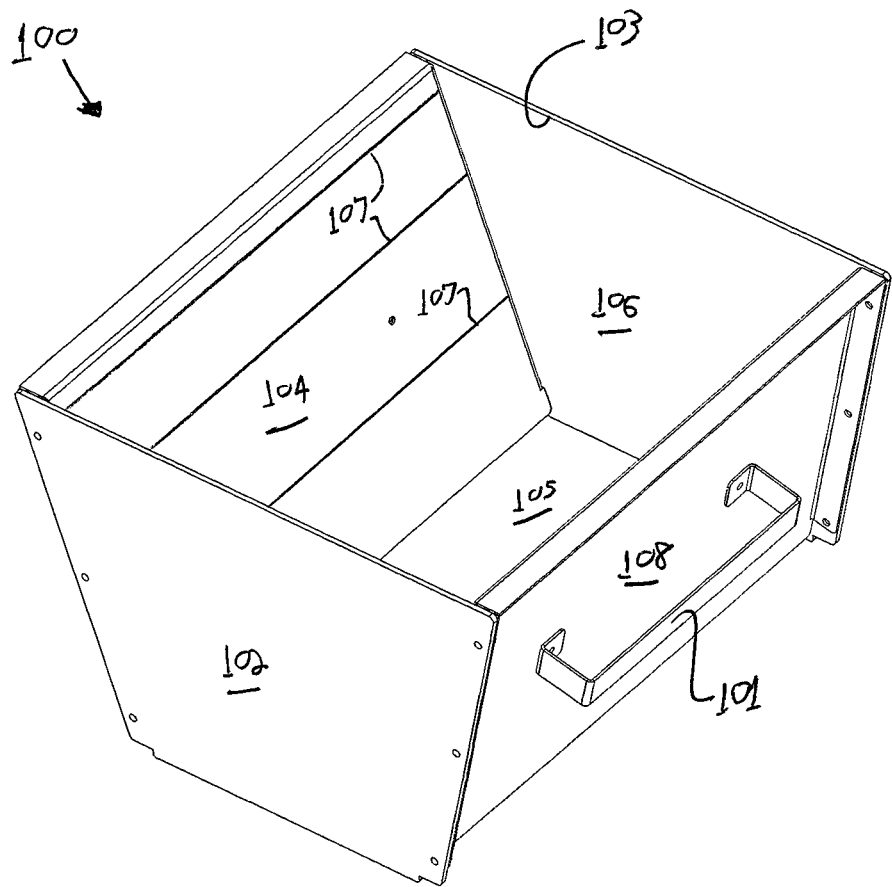
FIG. 14A is a first ice bin for use with the compact rapid chilling devices of the invention.

As mentioned above, it is desirable to provide a structure for providing and/or pre-measuring ice to be supplied for the chilling process. As shown in FIGS. 13 and 14A, the preferred structure contemplated by the invention is ice bin 100. Ice bin 100 preferably has side walls 102, 104, 106, and 108, an open top 103, and an open bottom 105. At least one and preferably two handles 101 are provided on opposing side walls, e.g., side walls 104 and 108 as shown in FIGS. 13 and 14A, to facilitate the ice bin's placement atop and removal from lid 12' (or lid 12 of FIGS. 1-2). The cross section of ice bin preferably decreases from top to bottom, i.e., open top 103 is larger than open bottom 105, and side walls 102 and 106 are preferably trapezoidal in shape. This creates a funneling effect to best position and maintain the ice atop the container. It is preferred that open bottom 105 be dimensioned and adapted to matingly engage window 119 of lid 12'. In that way, bin 100 may be attached to or simply placed atop lid 12' (or 12) to provide a large volume of bounded space in communication with window 19 for containing an adequate supply of ice for chilling the contents of a container.

In one embodiment, ice bin 100 is sized so as to contain the proper amount of ice when full to ensure proper chilling of the liquid contents of a container of a predetermined size regardless of the liquid's type or starting pre-chilled temperature. Since the liquid in question is preferably soup, stock, or sauce, which are all predominantly water-based, the liquid contents of container 60 will never realistically exceed 212° F. As such, knowing the volume of the container and its maximum potential temperature, an approximate amount of ice can be determined which will assuredly chill even the hottest contents. For example, for a 2-gallon stainless steel container, the ice bin is preferably large enough to hold at least 20 lbs of ice, and for a 5-gallon stainless steel container, the ice bin is preferably large enough to hold at least 50 lbs of ice.

Alternatively or in addition, if the temperature of the container's contents are fairly precisely knowable, the amount of ice can be adjusted accordingly. As such, if the temperature of the liquid is accurately measured just prior to chilling, more or less ice can be used (and since ice is inexpensive but not free, avoiding using more ice than necessary is desirable). As shown in FIG. 14A, ice bin 100 may be provided with one or more fill lines 107 which indicate how much ice should be used for a given type of liquid or a given temperature. For example, if it is known that the liquid is starting off at 140° F., ice bin 100 would be filled to a first or lowermost fill line 107. By contrast, if it is known that the liquid is starting off at 190° F., ice bin 100 would be filled to a higher fill line 107. Should the liquid be still boiling when poured into the container (and thus at or near 212° F.), ice bin 100 would be filled to the highest fill line 107 (or near or to the top of the bin, according to the preference of the manufacturer to leave space atop the ice bin or not).

Figure 14B:
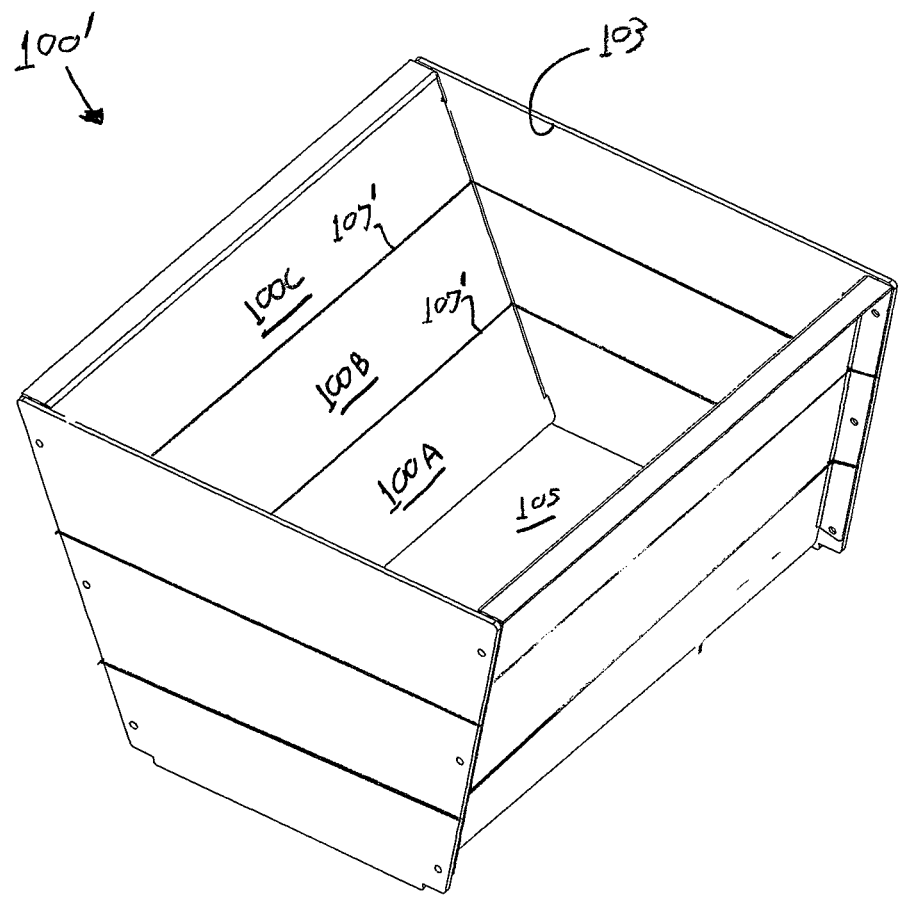
FIG. 14B is a second segmented ice bin for use with the compact rapid chilling devices of the invention.
Figure 15:
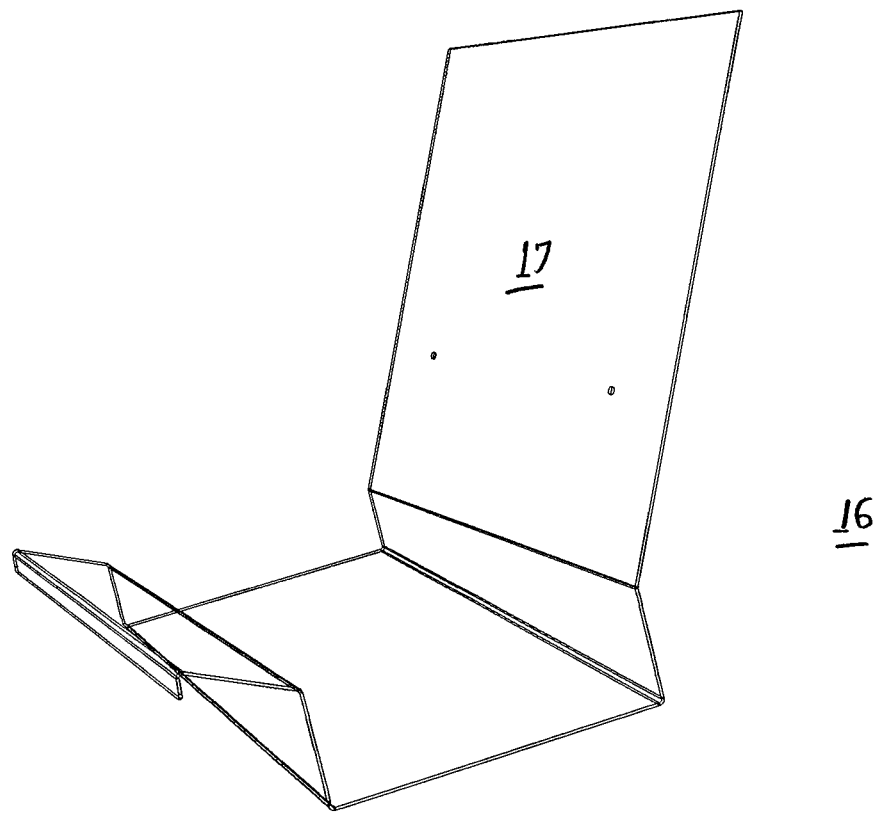
FIG. 15 is a perspective view of a hull portion of a compact rapid chilling device.

An alternative ice bin 100' is depicted in FIG. 14B. Here, instead of demarking the proper quantity of ice with fill lines 107, the overall ice bin 100' is constructed of stackable or otherwise attachable segments 100A, 100B, and 100C. (More or fewer than three segments may be utilized). In this embodiment, each segment 100A-C is marked accordingly to indicate the corresponding type or temperature of liquid to be chilled for which that segment is required. For example, if the liquid is starting off at 140° F., ice bin segment 100A would be large enough to hold sufficient ice to chill the liquid. By contrast, if the liquid is starting off at 190° F., ice bin segment 100B would be nested or stacked atop ice bin segment 100A to create a larger bounded volume and thus enable a greater quantity of ice to be used to chill the container. Should the liquid be still boiling when poured into the container (and thus at or near 212° F.), ice bin segment 100C would be nested or stacked atop ice bin segment 100B to create a still larger bounded volume for an even greater quantity of ice. Seams 107' are preferably constructed to be substantially watertight so as to avoid any leakage from melting ice in ice bin 100'. Handles such as handles 101 of ice bin 100 are optionally provided on each or selected of segments 100A-C.

As another alternative, different sizes of unitary (i.e., non-segmented) ice bins can be supplied with the device and used according to the chilling requirements of the moment (e.g., type of liquid, temperature of the liquid, desired final chilled liquid temperature, etc.).

Optionally, the volume of ice bin 100 may be integrated or incorporated into the lid/container securing space, to avoid providing a separate component. That is, in an alternative design, the lid and/or hull are made larger above the container (but not wider where the container securing space comes close to the container) so as to hold sufficient ice without the need for a separate attachable ice bin. In the main embodiments of FIGS. 11-16, the container securing space is designed to maintain ice above the container without necessarily being the sole repository of that ice (the bulk of the ice resides in the ice bin). In this alterative embodiment, the container securing space is made sufficiently large so that it also holds are contains the ice without the need for a separate ice bin.

Figure 3:
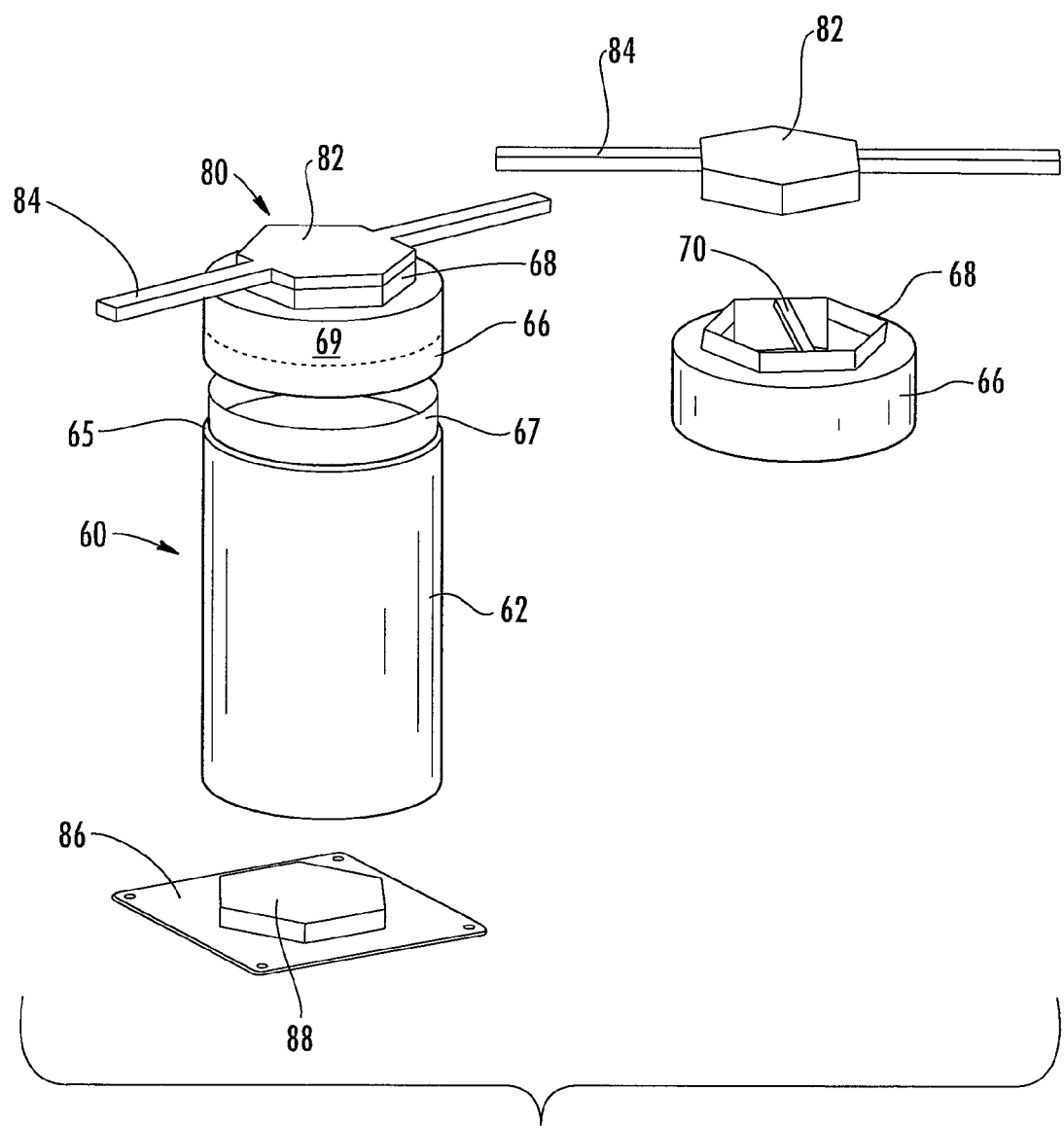
FIG. 3 is an upper perspective view of a stock chilling container, associated tightening tool, and container tightening station in accordance with the invention.
Figure 4:
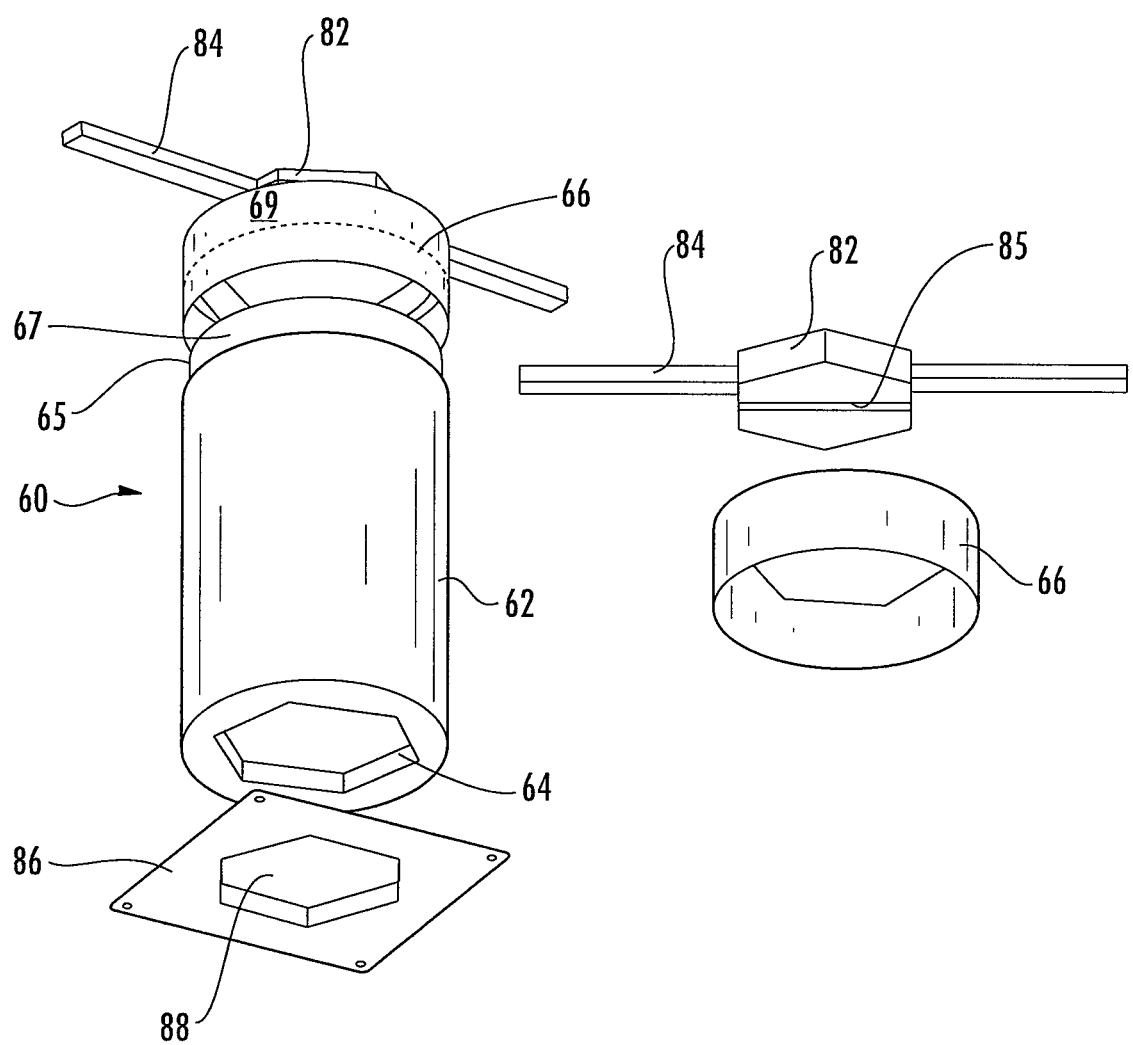
FIG. 4 is a lower perspective view of the stock chilling container, associated tightening tool, and container tightening station of FIG. 3 in accordance with the invention.
Figure 5:
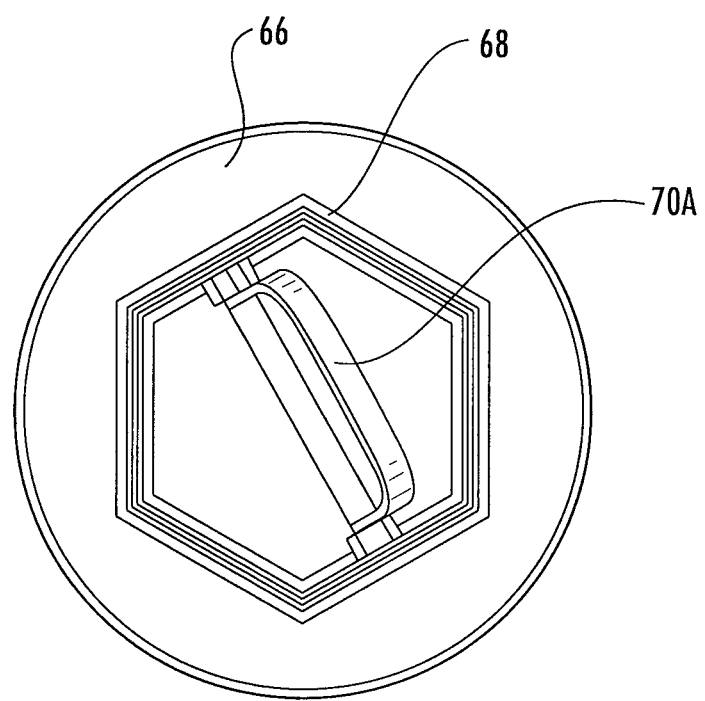
FIG. 5 is a top elevational view of a lid of a stock chilling container in accordance with the invention.

FIGS. 3 and 4 depict an embodiment of the inventive stock chilling and storing container 60 to be used with the chilling device 8 of FIGS. 1-2 or device 8' of FIGS. 11-16. Container 60 includes a hollow base 62 which serves to contain a quantity of stock, soup, sauce, or the like. Base 62 is preferably a substantially straight cylinder to allow for smooth rotation with limited interference or splashing. The bottom of base 62 is preferably provided with a recess 64 to be explained below.

Lid 66 is designed to seal to the top of base 62. Several different mechanisms of attaching lid 66 to base 62 are shown in the drawings in FIGS. 8-A-E. For example, in FIGS. 8A-B, container housing 62 is provided with threads 90A, and lid 66 is provided with mating threads 90B. Lid 90B is threaded onto the top of housing 62 in a conventional manner.

Figure 8A:
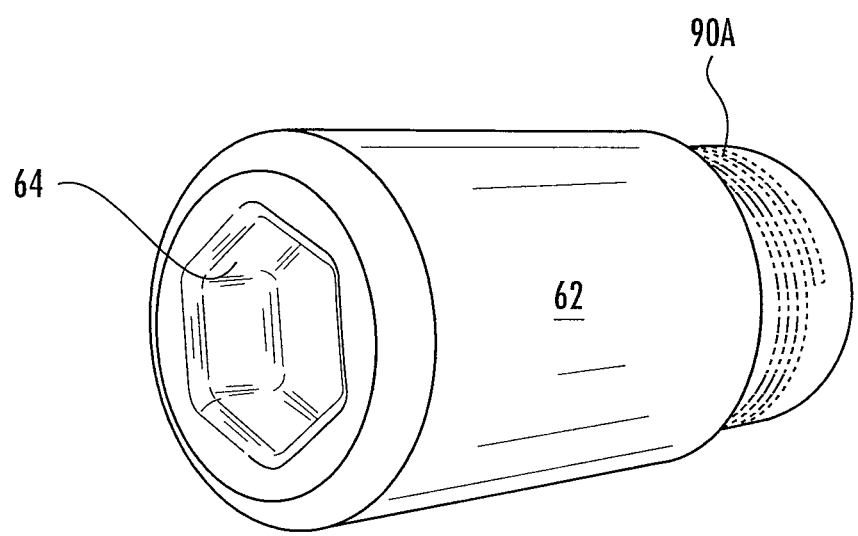
FIGS. 8A-B are perspective views of a threaded attachment mechanism connecting the lid and container housing in accordance with the invention.
Figure 8B:
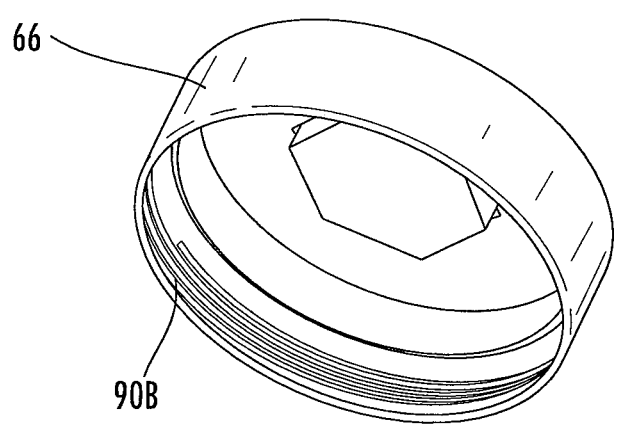
Figure 8C:
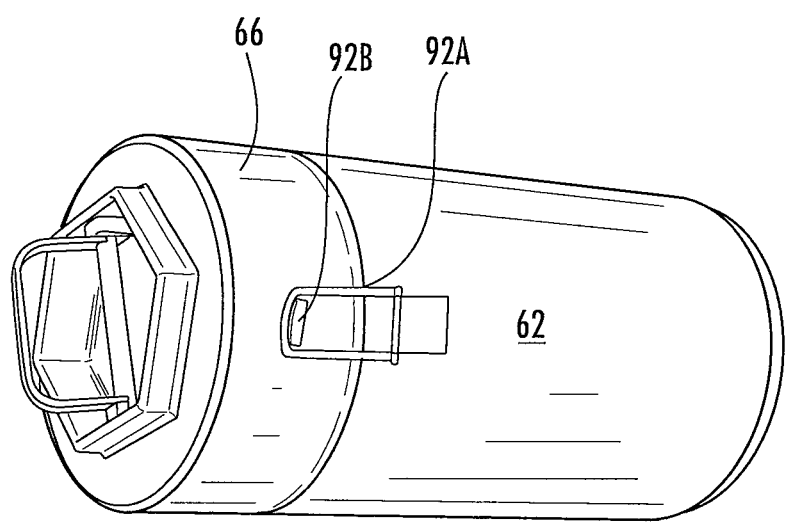
FIG. 8C is a perspective view of a latched embodiment of the attachment mechanism connecting the lid and container housing in accordance with the invention.

Another attachment mechanism is shown in FIG. 8C. In this embodiment, housing 62 is provided with a latch 92A, and lid 66 is provided with a catch 92B. Latch 92A is brought up around and secured to catch 92B, forming a tight fit. Alternatively, the latch may be mounted on lid 66 and the corresponding catch may be mounted on housing 62.

Figure 8D:
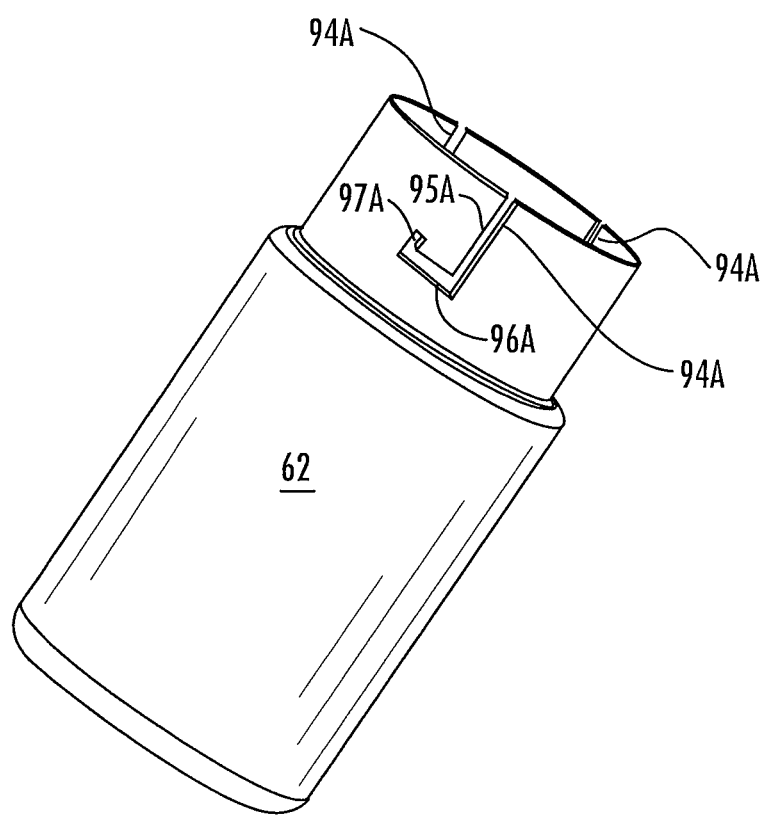
FIGS. 8D-E are perspective views of a bayonet fitting attachment mechanism connecting the lid and container housing in accordance with the invention.
Figure 8E:
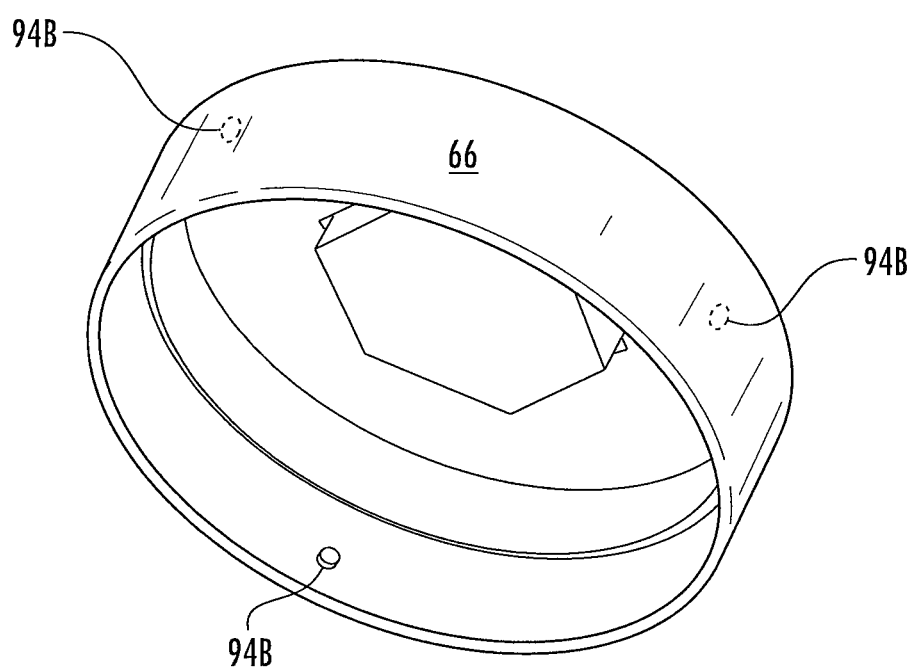

Still another mechanism is shown in FIGS. 8D-E. The upper rim of container housing 62 may be provided with a bayonet channel 94A (see FIG. 8D) which matingly engages with a corresponding projection 94B formed on lid 66. Bayonet channel 94A preferably includes a first vertical section 95A, a horizontal section 96A, and a second vertical section 97A. Projection 94B is adapted to fit within first vertical section 95A and bottom out just short of (i.e., above) horizontal section 96A. When the user presses firmly down (i.e., longitudinally) on lid 66 against container housing 62, a seal, gasket, or other resilient member (not shown) is compressed, lid 66 moves slightly closer to housing 62, and projection 94B is thus aligned with horizontal section 96A. The user then twists lid 66 relative to housing 62 so that projection 94B travels along the length of horizontal section 96A until it abuts against the far wall of second vertical section 97A. At this point, the user releases the longitudinal pressure on the lid relative to the housing; the seal or gasket (or other resilient member) expands, and projection 94B is moved upward and trapped within second vertical section 97A. FIGS. 8D-E show the use of three channels 94A and three corresponding projections 94B, however any convenient number may be employed. Additionally, while the channel 94A is shown having three distinct and substantially orthogonal sections 95A, 96A, and 97A, other configurations of channels with non-orthogonal or curved portions may be employed.

Regardless of the attachment mechanism, an O-ring or similar seal (not shown) is provided either on lid 66 or the shoulder 65 of base 62 so that a tight seal may be made between the lid and the base, preferably an air- or water-tight seal.

Lid 66 is provided with a protrusion 68 shaped substantially identically to recess 64 of base 62. In this way, multiple containers 60 may be stacked and stored in a space-efficient manner. A handle 70 is preferably provided on lid 66, preferably within the perimeter of protrusion 68, to facilitate handling of the container.

In addition to maximizing stacking and storing, protrusion 68 and recess 64 also serve to allow a user to tighten and loosen lid 66 from base 62 to a much greater degree. A tightening system is preferably provided along with the stock chiller and containers, which includes a tightening tool 80 and a tightening station 86 (see FIGS. 3 and 4). Tool 80 has a central body 82 which corresponds in shape to that of protrusion 68; body 82 either fits inside the perimeter of protrusion 68 or around it (see tool 80A of FIG. 7, for example). In either case, tool 80, 80A includes one or more handles or arms 84 for providing a better grip and additional torque for a single user to turn the lid with respect to the base. To insure that base 62 does not slip during tightening or loosening, base 62 is disposed on tightening station 86, which includes a protrusion 88 for engaging recess 64. This way, when a user tightens or loosens a lid 66, he need not struggle with the base to keep it motionless.

Figure 6:
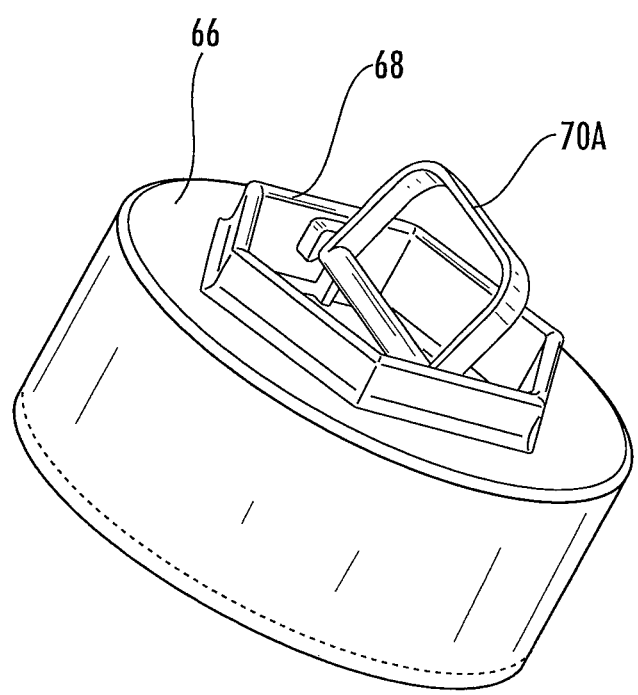
FIG. 6 a side perspective view of the lid of a stock chilling container of FIG. 5 in accordance with the invention.
Figure 7:
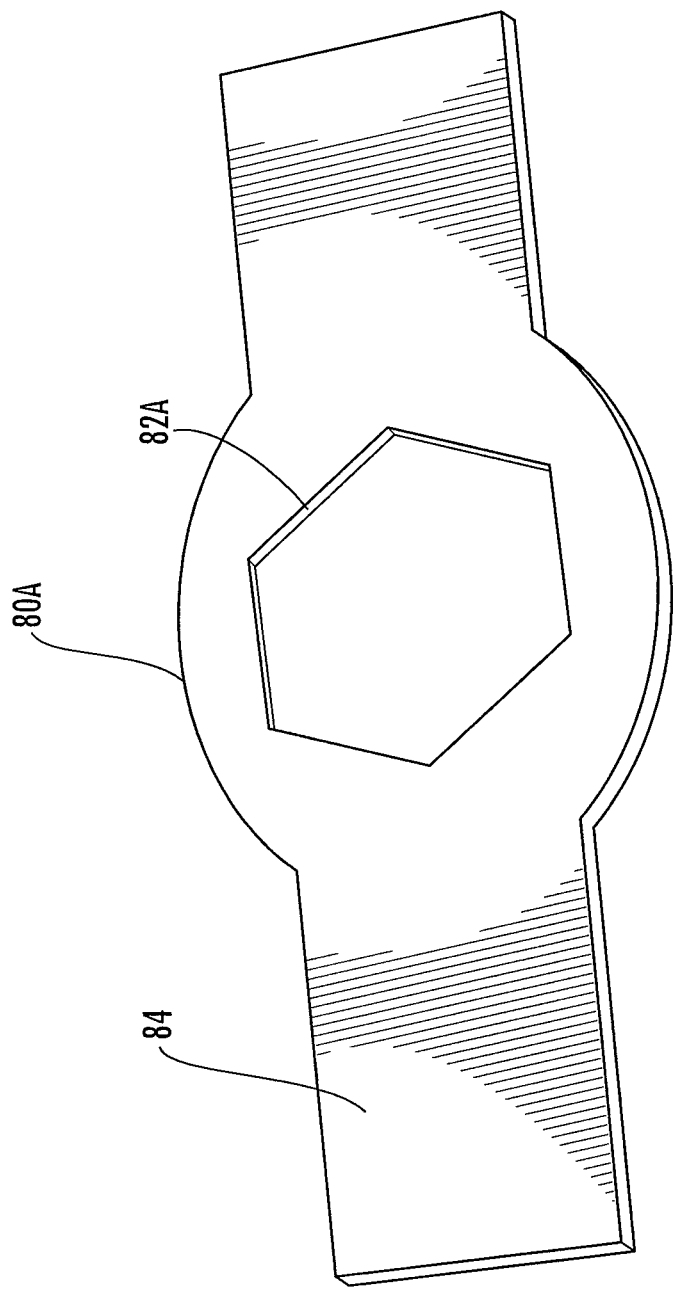
FIG. 7 is a top perspective schematic of another embodiment of a tightening tool in accordance with the invention.

Handle 70 shown in FIG. 3 is a simple straight bar disposed within protrusion 68. For such an embodiment, body 82 of tool 80 is provided with a slot 85 for engaging/accommodating the handle. FIGS. 6 and 7 show an improved handle 70A which swivels up and down. Tool 80A need not engage handle 70A at all, but rather engages the outer perimeter of protrusion 66.

Figure 10:
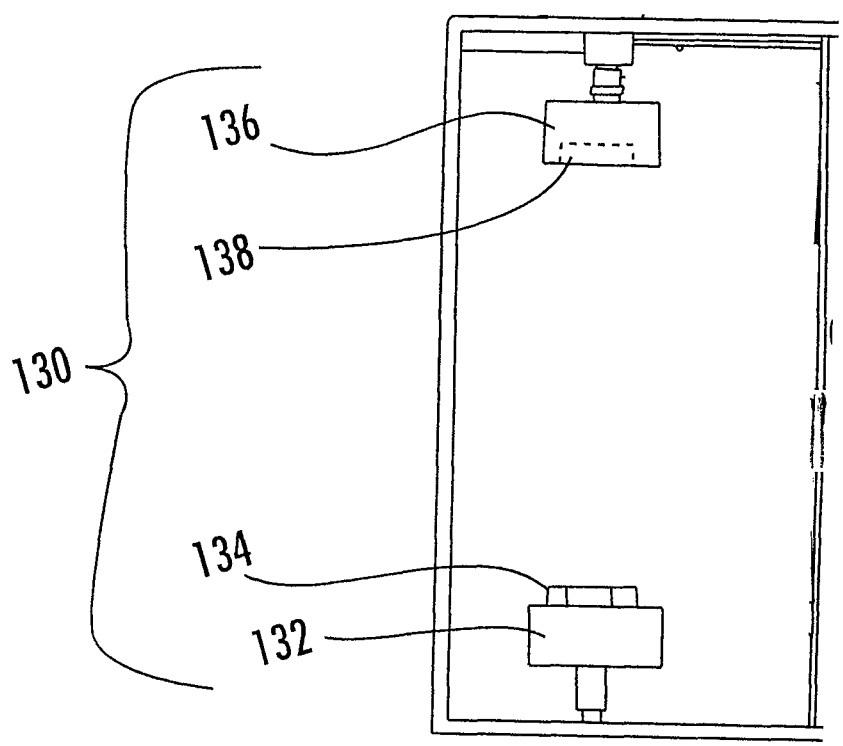
FIG. 10 is a top elevation view of another embodiment of the container rotator in accordance with the invention.

By providing protrusion 66 and recess 64, alternate means of rotating the containers 60 may be provided than using rollers 40 described above. For example, as shown in FIG. 10, container rotator 130 includes a first mount 132 having a projection or block 134 designed to fit within recess 64 of container housing 62. Rotator 130 may also (or in the alternative) include a second mount 136 having a recess 138 designed to fit around projection 68 of container lid 66. One or both of mounts 132 and 136 may be spring mounted so as to be movable out of the way to accommodate the insertion and removal of a container. Alternatively, one or both mounts may be moved via ball screws, a clamping handle, or other mechanical means (not shown).

To insure that the stock contained within container 60 mixes adequately when the container is being rotated and sprayed to thereby maximize heat transfer out of the stock, container 60 is provided with an inherent void volume built into the lid. The void volume is an amount of air space included in the container once the lid is sealed on tight. Container 60 may be filled up to the top edge of rim 67, however when lid 66 is attached onto base 62, the upper portion 69 of lid 66 extends above the top edge of rim 67, thereby necessarily trapping air and preventing a sealed container 60 from being completely full. The void volume is preferably 5% of the volume of the closed container but can be as little as 1-2% and still be effective.

The preferred embodiment of the container is made from food grade stainless steel and includes a plastic liner. The container is cylindrical in shape, available in different sizes (e.g., 1 gallon, 2 gallons, 5 gallons).

Figure 9A:
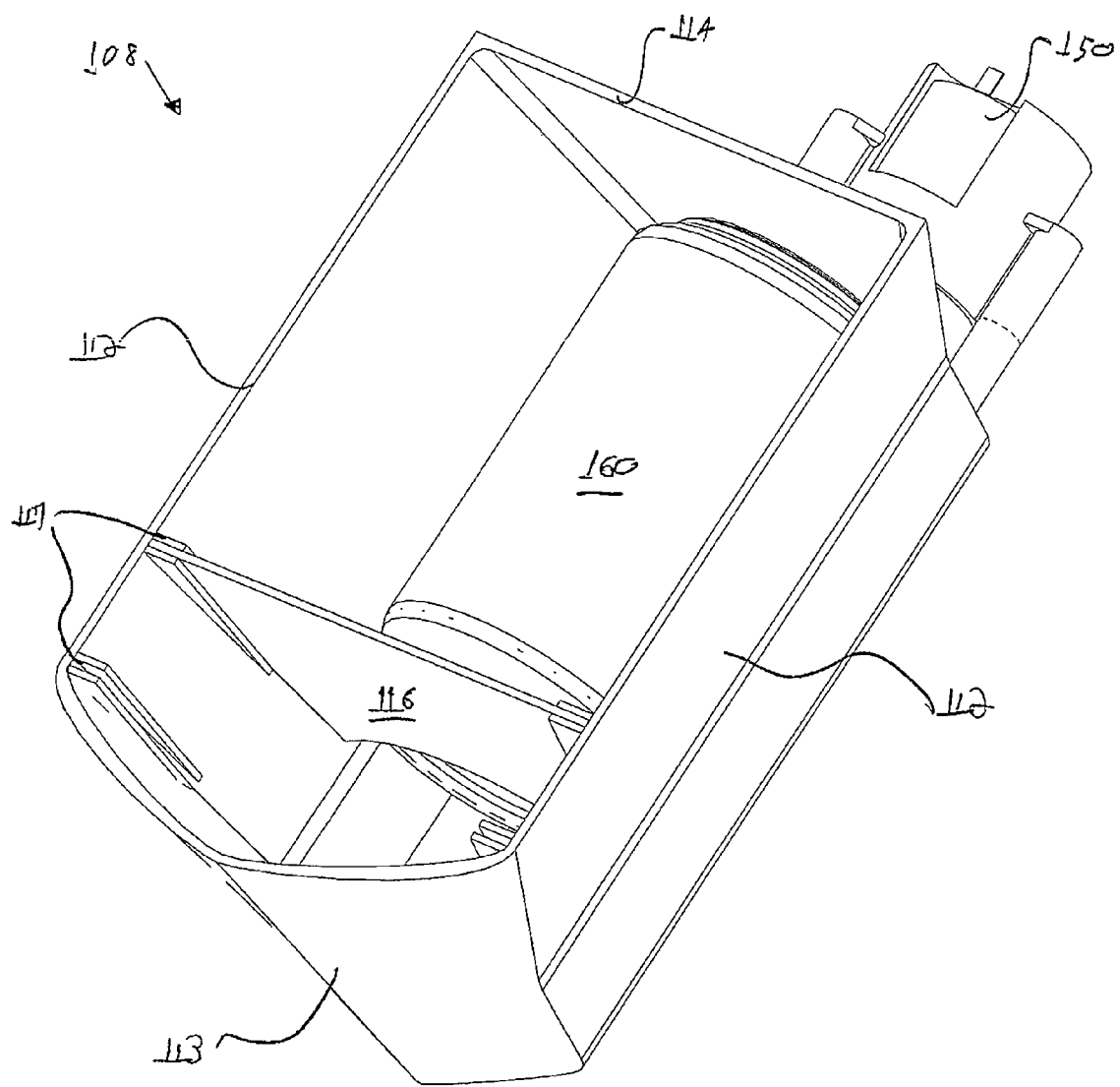
FIG. 9A is a top perspective view of a device in accordance with the invention particularly suited to chilling beverage containers.
Figure 9B:
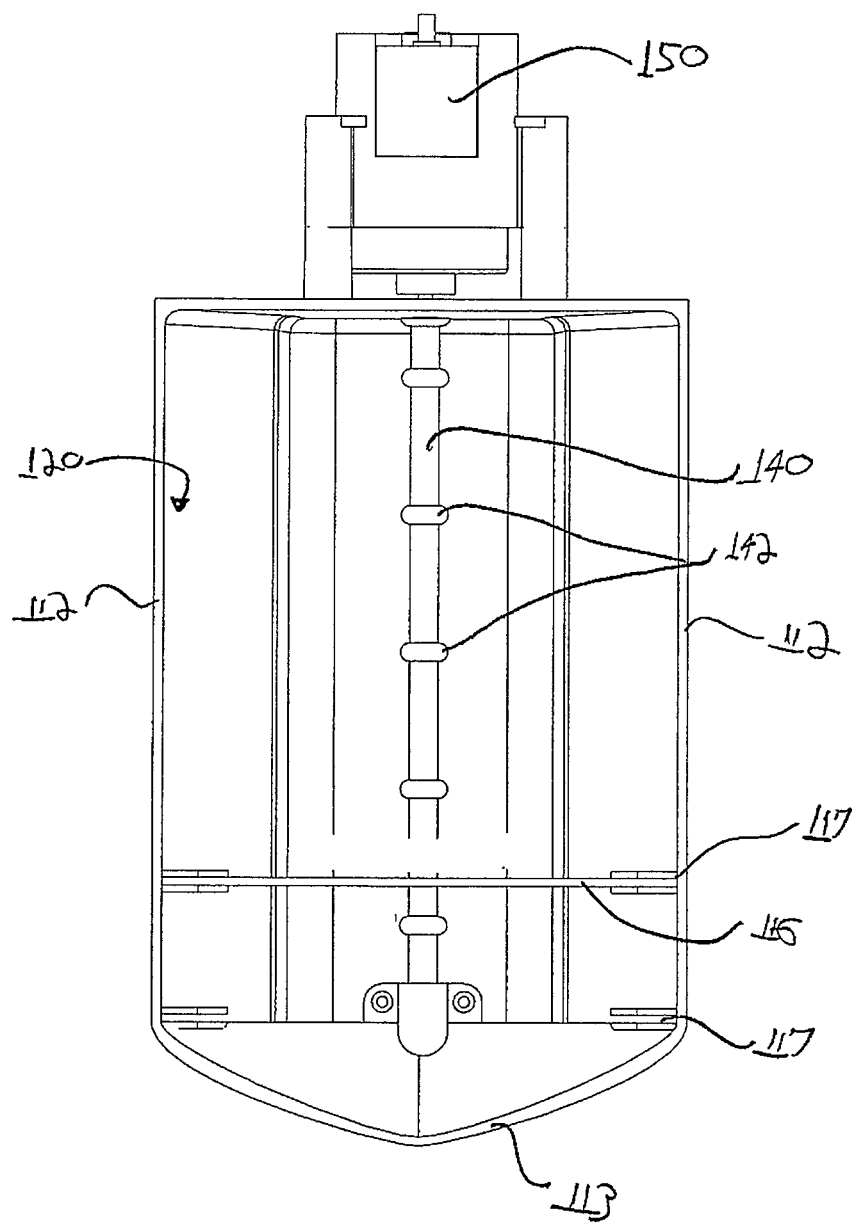
FIG. 9B is a top elevation view of the device of FIG. 9A.

In addition to utilizing the inventive method on hot bulk liquids such as stock or soup in a commercial kitchen, it is also applicable for chilling beverage containers such as cans or bottles of soda, beer, juice, and the like. FIG. 9 depicts a unit 109 for chilling beverage cans 160. Here, can 160 is placed inside container bay 120, made up of side walls 112, front wall 113, and rear wall 114. The top of container bay 120 is substantially open. The bottom section of side walls 112 are spaced apart so that they leave very little space (e.g., ⅛ inch) between a can 160 placed atop roller 140 and side walls 112.

Figure 9C:
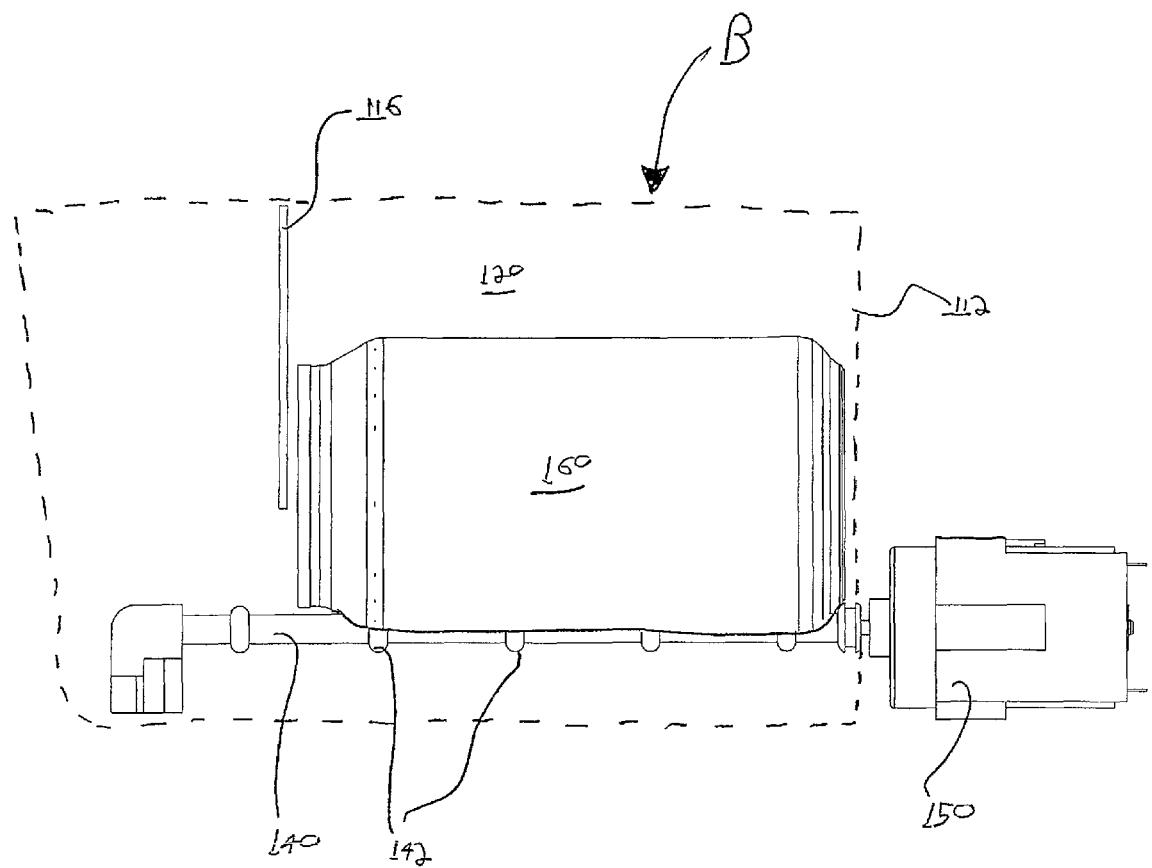
FIG. 9C is a side elevation view of the device of FIGS. 9A-B with the container bay removed for clarity.

Side walls 112 are preferably angled outward from bottom to top to allow a significant quantity of ice (preferably in cube or chip form)to be placed atop can 160 in the direction of arrow B of FIG. 9C. Since there is very little space between can 160 and side walls 112, ice placed atop can 160 will substantially remain atop can 160 until it melts away. Front wall 113 is preferably bowed or angled in the middle like a spout-like structure so that the device may be easily drained simply by pouring the water from the melted ice out of bay 120.

Roller 140 is provided with frictional contact rings 142 as above. In this embodiment, motor 150 is directly attached to roller 140, thereby minimizing the overall profile of the device.

Because cans come in different lengths (though typically in the same or similar widths), baffle 116 is provided, engageable with slots 117. For longer cans, baffle 116 is inserted into the slot 117 closer to front wall 113. For shorter cans, baffle 116 is inserted into the slot 117 further away from wall 113. In FIG. 9, only two slots 117 are shown, however the invention is not so limited. Multiple slots 117 may be provided to accommodate multiple lengths of cans (e.g., 8 oz., 12 oz., 16 oz., etc.).

In operation, device 109 works as follows. First, the proper position of baffle 116 is selected. Can 160 is placed inside container bay 120 atop roller 140. Ice is added atop can 160. Because of the close proximity of side walls 112, baffle 116, and rear wall 114 to can 160, ice placed thereupon does not fall below can 160 but rather remains atop the can. Motor 150 is activated, causing roller 140 to rotate. Frictional rings 142 grip the side wall of can 160 and cause can 160 to rotate as well. Preferred rotational speeds for this embodiment range from approximately 200 to approximately 400 rpm, though slower and faster speeds are also contemplated. As the can rotates with ice thereupon, heat is transferred from the contents of can 160 to the ice, thereby cooling the can contents and melting the ice. In a matter of a minute or two, the contents of the can are sufficiently cold for drinking. The can is removed and the beverage is consumed. Melted ice is poured out of bay 120 by tipping the device over across the top of front wall 113.

The invention is not limited to the above description. For example, in FIGS. 1-2 and 11-16, the lid is shown as pivotably attached to the hull or housing. However, the lid may be attached via a sliding mechanism, or in any other convenient manner, or it may be completely separable and not permanently attached at all. Also, as described above, the ice bin volume may be made integral with the lid, i.e., the lid may be made larger to accommodate hold and all of the ice required to chill a container. As another alternative, the lid may be done away with, and an ice bin adapted to be disposed directly onto the housing may be provided. In other words, rather than incorporating the ice bin volume into the lid, in this case, the lid function is incorporated into the removable ice bin.

As another example, the embodiments shown in the drawings and described above have the ice directly contacting the portion of the container accessible through the window. However, all that is required is that the ice be in thermal communication with the container. As such, an intermediate structure may be provided that allows thermal communication between the ice and the container but prevents the ice from falling below the container. Such a structure takes the form of a mesh, fabric, or tight lattice barrier, preferably flexible, so as to allow the ice above to mold itself to the contours of the container without falling, and also to allow the water formed from the ice melting to form a thin film around the container.

In another example, the drive mechanism described above includes a motor having a pulley with a belt connected to a pulley on the roller. However, any other drive mechanisms are also contemplated as being within the scope of the invention, e.g., a direct drive mechanism. Rotational speeds of these type of drive mechanisms can be varied as known in the field, e.g., by varying the voltage delivered to the drive.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A compact rapid liquid chilling device, comprising: a housing including a container securing space adapted to secure a container of liquid to be chilled to a desired temperature, said housing including a lid, closable around the container, having a window adapted to allow ice to be supplied to said container securing space; said container securing space dimensioned to receive a pre-measurable quantity of ice for a given container and maintain substantially all of the ice loosely and freely atop the container placed in said container securing space and at least partially in thermal communication with the container without allowing substantially any of the ice to fall below the container, said pre-measurable quantity of ice being sufficient to chill the liquid in the container to the desired temperature; an ice bin having side walls and an opening, said opening adapted to fit together with said window in said lid in communication with and thereby extending said container securing space, said ice bin adapted to allow the user to pre-measure the quantity of ice necessary to chill the contents of the container to a desired temperature; a rotating mechanism disposed in said housing in communication with said container securing space adapted to rotate a container placed in said container securing space, wherein as the ice melts to form water as the heat is extracted from the contents of the container, the water is allowed to fall freely below the container while un-melted ice remains above the container.

2. The compact rapid liquid chilling device according to claim 1, said housing further comprising a hull which includes a first portion of said container securing space, said lid further comprising a second portion of said container securing space when said lid is closed.

3. A compact rapid liquid chilling device according to claim 1, said housing further comprising a drain that allows the water that falls below the container to exit said housing.

4. The compact rapid liquid chilling device according to claim 1, further comprising a movable baffle selectively disposable within said housing and adapted to allow the user to adjust the volume of said container securing space.

5. The compact rapid liquid chilling device according to claim 1, wherein as the ice melts to form water as the heat is extracted from the contents of the container, the water forms a thin film that is allowed to fall freely around the container while un-melted ice remains above the container.

6. The compact rapid liquid chilling device according to claim 1, further comprising at least one ice guard, disposed at an edge of said window and extending towards the container, adapted to substantially prevent ice from said ice bin from falling below the container.

7. A compact rapid liquid chilling device according to claim 6, wherein a tolerance between said ice guard and the container is less than or equal to 0.20 inches.

8. The compact rapid liquid chilling device according to claim 1, wherein said ice bin is integral with said lid.

9. A compact rapid liquid chilling apparatus, comprising: a sealable container having an inherent void volume adapted to receive a liquid to be chilled; a housing including a container securing space adapted to secure said container of the liquid to be chilled to a desired temperature, said housing including a lid, closable around said container, having a window adapted to allow ice to be supplied to said container securing space said container securing space dimensioned to receive a pre-measurable quantity of ice for a given container and maintain substantially all of the ice loosely and freely atop said container placed in said container securing space and at least partially in contact with said container without allowing substantially any of the ice to fall below said container, said pre-measurable quantity of ice being sufficient to chill the liquid in said container to the desired temperature; an ice bin having side walls and an opening, said opening adapted to fit together with said window in said lid in communication with and thereby extending said container securing space, said ice bin adapted to allow the user to pre-measure the quantity of ice necessary to chill the contents of said container to a desired temperature; a rotating mechanism disposed in said housing in communication with said container securing space adapted to rotate said container placed in said container securing space, wherein as the ice melts to form water as the ice chills the contents of said container, the water is allowed to fall freely below said container while un-melted ice remains above said container.

10. The compact rapid liquid chilling apparatus according to claim 9, said housing further comprising a base which includes a first portion of said container securing space, said lid further comprising a second portion of said container securing space when said lid is closed.

11. A compact rapid liquid chilling apparatus according to claim 9, said housing further comprising a drain that allows the water that falls below said container to exit said housing.

12. The compact rapid liquid chilling device according to claim 9, wherein said ice bin is integral with said lid.

* * * * *